United States Patent
Yang et al.

(10) Patent No.: US 10,089,081 B2
(45) Date of Patent: Oct. 2, 2018

(54) METHOD AND/OR APPARATUS FOR GENERATING SIGNAL PROCESSING PIPELINES

(71) Applicant: Excalibur IP, LLC, New York, NY (US)

(72) Inventors: Guangxin Yang, Beijing (CN); Ji Zhou, Haidian (CN); Shuo Yang, Beijing (CN); Yan Xia, Haidian (CN); Delu Zhu, Haidian (CN)

(73) Assignee: Excalibur IP, LLC, New York, NY (US)

( * ) Notice: Subject to any disclaimer, the term of this patent is extended or adjusted under 35 U.S.C. 154(b) by 0 days.

(21) Appl. No.: 14/654,468

(22) PCT Filed: Dec. 31, 2014

(86) PCT No.: PCT/CN2014/095912
§ 371 (c)(1),
(2) Date: Jun. 19, 2015

(87) PCT Pub. No.: WO2016/106691
PCT Pub. Date: Jul. 7, 2016

(65) Prior Publication Data
US 2017/0300302 A1    Oct. 19, 2017

(51) Int. Cl.
*G06F 9/44* (2018.01)
*G06F 8/34* (2018.01)
(Continued)

(52) U.S. Cl.
CPC .............. *G06F 8/34* (2013.01); *G06F 3/0482* (2013.01); *G06F 17/30498* (2013.01)

(58) Field of Classification Search
CPC .................................. G06F 8/34; G06F 8/4452
(Continued)

(56) References Cited

U.S. PATENT DOCUMENTS

| | | | | |
|---|---|---|---|---|
| 5,333,280 A | * | 7/1994 | Ishikawa | G06F 8/445 |
| | | | | 712/215 |
| 6,226,776 B1 | * | 5/2001 | Panchul | G06F 17/5045 |
| | | | | 716/102 |

(Continued)

FOREIGN PATENT DOCUMENTS

| | | |
|---|---|---|
| CN | 102413375 A | 4/2012 |
| CN | 102685582 A | 9/2012 |

(Continued)

OTHER PUBLICATIONS

An Open Source Workbench for Prototyping Multimodal Interactions Based on Off-The-Shelf Heterogeneous Components; Jean-Yves Lionel Lawson, Benoît Macq—Communications and Remote Sensing Laboratory; Jean Vanderdonckt—Belgian Lab. of Computer-Human Interaction; Ahmad-Amr Al-Akkad-Fraunhofer FIT Schloss Birlinghoven Germany; EICS'09, 2009.*

(Continued)

*Primary Examiner* — Francisco Aponte
(74) *Attorney, Agent, or Firm* — Berkeley Law & Technology Group, LLP

(57) ABSTRACT

A method and apparatus for generating a signal processing pipeline based, at least in part, on manipulation of a GUI, the signal processing pipeline comprising one or more signal processing operations.

15 Claims, 4 Drawing Sheets

(51) Int. Cl.
*G06F 17/30* (2006.01)
*G06F 3/0482* (2013.01)

(58) Field of Classification Search
USPC .......................................................... 717/109
See application file for complete search history.

(56) References Cited

U.S. PATENT DOCUMENTS

| | | | | |
|---|---|---|---|---|
| 6,226,783 B1* | 5/2001 | Limondin | G06F 8/34 | 717/104 |
| 6,260,189 B1* | 7/2001 | Batten | G06F 8/4451 | 717/151 |
| 6,643,630 B1* | 11/2003 | Pegatoquet | G06F 8/41 | 706/45 |
| 6,662,357 B1* | 12/2003 | Bowman-Amuah | G06F 8/20 | 717/120 |
| 6,934,667 B2* | 8/2005 | Kodosky | G06F 8/34 | 702/57 |
| 6,934,668 B2* | 8/2005 | Kodosky | G06F 8/34 | 702/57 |
| 6,954,724 B2* | 10/2005 | Kodosky | G06F 8/34 | 702/57 |
| 6,961,686 B2* | 11/2005 | Kodosky | G06F 8/34 | 702/57 |
| 6,983,228 B2* | 1/2006 | Kodosky | G06F 8/34 | 702/57 |
| 6,993,466 B2* | 1/2006 | Kodosky | G06F 8/34 | 702/57 |
| 7,010,470 B2* | 3/2006 | Kodosky | G06F 8/34 | 702/57 |
| 7,177,786 B2* | 2/2007 | Kodosky | G06F 8/34 | 702/57 |
| 7,327,786 B2* | 2/2008 | Winger | H04N 19/176 | 375/240.12 |
| 7,386,833 B2* | 6/2008 | Granny | G06F 17/5027 | 717/109 |
| 7,558,711 B2* | 7/2009 | Kodosky | G06F 8/34 | 702/57 |
| 7,707,014 B2* | 4/2010 | Kodosky | G06F 8/34 | 702/57 |
| 7,926,046 B2* | 4/2011 | Halambi | G06F 8/4452 | 717/106 |
| 7,974,825 B2* | 7/2011 | Linebarger | G06F 8/34 | 703/13 |
| 8,151,282 B2* | 4/2012 | Carnahan | G06F 9/4436 | 719/328 |
| 8,156,481 B1* | 4/2012 | Koh | G06F 9/443 | 717/151 |
| 8,166,394 B1* | 4/2012 | Melnicki | G06F 3/0482 | 715/200 |
| 8,250,342 B1* | 8/2012 | Kostarnov | G06F 9/30043 | 712/35 |
| 8,358,319 B2* | 1/2013 | Cote | G06T 3/4015 | 345/611 |
| 8,402,449 B1* | 3/2013 | Biswas | G06F 8/441 | 717/106 |
| 8,453,111 B2* | 5/2013 | Hudson, III | G06F 8/20 | 715/763 |
| 8,656,353 B2* | 2/2014 | Brendza | G06F 8/38 | 717/109 |
| 9,098,292 B1* | 8/2015 | Zhang | G06F 8/35 | |
| 9,141,365 B1* | 9/2015 | Zander | G06F 8/61 | |
| 9,141,823 B2* | 9/2015 | Dawson | G06F 21/6227 | |
| 9,239,712 B2* | 1/2016 | Rong | G06F 8/4452 | |
| 9,268,537 B1* | 2/2016 | Zhang | G06F 8/35 | |
| 9,329,840 B1* | 5/2016 | Koh | G06F 8/35 | |
| 9,542,361 B2* | 1/2017 | Jones | G06F 17/211 | |
| 9,652,203 B1* | 5/2017 | Haq | G06F 3/04842 | |
| 9,846,575 B1* | 12/2017 | Zander | G06F 8/61 | |
| 2003/0154469 A1* | 8/2003 | Anderson | G06F 9/325 | 717/161 |
| 2008/0292219 A1* | 11/2008 | Keall | H04N 5/357 | 382/313 |
| 2012/0030655 A1* | 2/2012 | de Castillo | G06F 8/51 | 717/125 |
| 2014/0176571 A1* | 6/2014 | Singh | G06T 1/20 | 345/501 |
| 2014/0359589 A1* | 12/2014 | Kodosky | G06F 8/451 | 717/149 |
| 2016/0110168 A1* | 4/2016 | Feder | G06F 8/34 | 717/106 |

FOREIGN PATENT DOCUMENTS

CN 103401725 A 11/2013
EP 2568630 A2 3/2013

OTHER PUBLICATIONS

Playingwithtime—Manipulationoftimeandrateinamulti-Ratesignalprocessingpipeline; Georg Essl—Computer Science & Engineering, University of Michigan; ICM 2012.*
Tyson, Eric J., "Auto-Pipe and the X Language: A Toolset and Language for the Simulation, Analysis, and Synthesis of Heterogeneous Pipelined Architectures, Master's Thesis, Aug. 2006" Report No. WUCSE-2006-50 (2006). All Computer Science and Engineering Research; Washington University in St. Louis, MO—63130.*
International Search Report, App. No. PCT/CN2014/095912, Filed Dec. 31, 2014, 3 Pages.
Written Opinion of the International Searching Authority, App. No. PCT/CN2014/095912, Filed Dec. 31, 2014, 3 Pages.
Bex, et al, "Inferring XML Schema Definitions from XML Data," VLDB '07, Sep. 23-28, 2007, Vienna, Austria, 12 Pages.
Rahm, et al, "A survey of approaches to automatic schema matching," VLDB Journal 10: 334-350, 2001, Digital Object Identifier (DOL) 10.1007/s0077801000057, 17 Pages.
Patent Cooperation Treaty, "Notification of Receipt of Search Copy," Int'l App. No. PCT/CN2014/095912, Filed Dec. 31, 2014, dated Jan. 14, 2015, 1 Page.
Patent Cooperation Treaty, "Notification of the Int'l App. No. and of the Int'l Filing Date," Int'l App. No. PCT/CN2014/095912, Filed Dec. 31, 2014, dated Jan. 14, 2015, 1 Page.
Patent Cooperation Treaty, "Notification of the Recording of a Change", Int'l Appl No. PCT/CN2014/095912, Filed Dec. 31, 2014, dated Jan. 20, 2015, 1 Page.

* cited by examiner

METHOD AND/OR APPARATUS FOR GENERATING SIGNAL PROCESSING PIPELINES

FIELD

The subject matter disclosed herein relates generally to generating signal processing pipelines (SPPs).

BACKGROUND

Generating a signal processing pipeline (SPP) is typically time consuming, complex, cumbersome and may also employ a relatively high degree of technical competence. It would be desirable, therefore, to have a better, easier, and/or less time consuming approach to signal processing pipeline generation.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
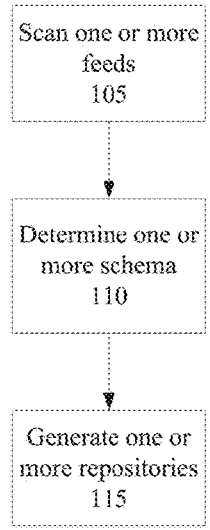
FIG. 1 is a flow chart illustrating one example of a method embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In the context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of the system, in an embodiment. As mentioned, one non-limiting, but well-known example, is the Hadoop distributed computing system. It refers to an open source implementation of a map-reduce type architecture, but may include other aspects, such as the Hadoop distributed file system (HDFS). In general, therefore, Hadoop and/or similar terms refers to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc. A network may be very large, such as comprising thousands of nodes, millions of nodes, billions of nodes, or more, as examples.

Signal processing pipelines are typically custom generated for a particular signal processing task. For example, a web portal, such as a web portal provided by YAHOO!, may process vast amounts of client-server interactions on a daily basis, such as those related to browsing activities of users. Web portals, as one example, typically desire to be more attractive to advertisers by, among other things, offering an ability to recognize and perhaps take advantage of trends in user interest, such as popular content, etc. To do so, frequently involves some form of signal processing of client-server interactions, which may, for example, capture browsing activities of a range of users. Given the nature of the signal processing task, custom generation of a signal processing pipeline is usually employed for such situations. As used herein, the term signal processing pipeline (SPP) and/or similar terms refers to a set of components arranged in a manner to achieve reasonable and/or relatively high throughput by operating in synchrony along which signal flow takes place via a set of operations, often with at least some being in an ordered sequence.

In an embodiment, a signal processing pipeline (SPP) may receive one or more signals (e.g., signal samples) of a first format, one or more operations may be performed on the received one or more signals (e.g., signal samples) and one or more signals (e.g., signal samples) of a second format may be output. It may be delicate to successfully achieve reasonable or even relatively high throughput processing with a set of disparate and/or complex operations interacting on a variety of signal samples in various formats, for example. Hence, accomplishing and/or maintaining a delicate balance of competing factors in a manner that may be easier, less resource intensive, quicker to generate, and/or is capable of being formed using less technical know-how suggests a novel and inventive advance beyond the state of the art. Custom generation of a signal processing pipeline may involve a commitment of resources including, but not limited to, time spent planning and/or coding of a signal processing pipeline. It therefore may be desirable to have a capability to generate signal processing pipelines more easily, more quickly, employing less technical know-how and/or otherwise employing fewer other resources.

To illustrate, those tasked with designing and/or implementing a signal processing pipeline may formulate appropriate mechanisms for processing of a variety of signals and/or states (e.g., one or more collections of signal samples). Generation of a custom signal processing pipeline may typically involve multiple time- and resource-intensive undertakings. For example, identifying and/or determining operations to be used, identifying and/or determining signal formats to be used, testing and/or confirming desired operation, generating code, and/or testing the generated code, among other things, are some examples of tasks to be completed.

For instance, in a custom generation, any number of factors may desirably be taken into account including, for example, timing, ordering, etc., to provide appropriate signal processing. Furthermore, after coding, testing, usually as a part of quality control, may be undertaken. Thus, faults and/or errors of various types may then be identified, thus leading to potential changes in approach and/or re-coding. Additional technical challenges may also be encountered as a signal processing pipeline evolves. Thus, as suggested, generation of a signal processing pipeline may typically be complex, time consuming and/or resource intensive. An approach to make generating a signal processing pipeline easier and/or less resource intensive, for example, may, thus, be desirable.

In one embodiment, although claimed subject matter is not limited in scope in this respect, a process to yield a signal processing pipeline (SPP) may comprise use of a graphical user interface (GUI). A GUI refers to an interface of a computing device for interacting with the computing device via one or more graphical components and/or visual indicators, such as, for example, so as to result in, directly or indirectly, processing of one or more signals (e.g., signal samples), which may include transmission and/or reception of one or more signals (e.g., signal samples), in response to one or more interactions with the GUI. For example, a manipulation of a GUI may result in transmission of one or more signal samples, to or from a computing device displaying the GUI. In contrast, one form of non-graphical user interface comprises a command line interface, by way of non-limiting example, where interaction with a computing device is performed via, for instance, entry of text by a user. Non-limiting examples of graphical components and/or visual indicators that may be used and/or found in a GUI, such as a GUI embodiment of claimed subject matter, may include, for instance, a window, a text box, a menu, an icon, a button, a hyperlink, a drop-down list, a list box, a combo box, a check box, a radio button, a cycle button, a tab, etc.

Briefly, and as noted above, a manipulation of a GUI may trigger transmission and/or reception of one or more signal samples. To illustrate, without limitation, an example of how this may occur, in one non-limiting example, it may be useful to consider a mouse click, as one example illustration, performed with respect to a graphical component of a GUI. In this illustrative case, the mouse click may trigger (e.g., initiate) transmission of one or more signals (e.g., signal samples) from a peripheral device (e.g., a mouse or trackball, etc.) to a computing device, such as, for example, to initiate one or more commands to be executed corresponding to the click. Likewise, if a click corresponds to a selection of a hyperlink, by way of non-limiting example, one or more signals (e.g., signal samples) may be transmitted, such as via a transmission port of a computing device (e.g., Ethernet port, WiFi, etc.) from the computing device across a network to a remote server, for example. A remote server, for example, may receive one or more transmitted signals (e.g., signal samples). A remote server may, likewise, process one or more received signals (e.g., signal samples) to determine a corresponding command to be executed (e.g., retrieving a web page), and may transmit one or more signals (e.g., signal samples) back, etc.

One form of graphical component of a GUI may comprise a window. A window may comprise an area of a display to show or depict content in a manner that is displayed independently from the rest of displayed content. It is relatively easy for a user to manipulate a window: it may be shown and/or hidden by clicking on an icon or application, and it may be moved by dragging (e.g., by clicking in a certain area of a window—usually the title bar along the top). A window may be placed in front or behind another window, its size may be adjusted, and/or scrollbars may be used to navigate sections. Multiple windows may also be open at one time, in which case separate windows may display different applications and/or files. There may be various types of specialized windows.

A browser window allows a user to move forward and/or backwards through a sequence of electronic documents, such as web pages. Web browsers are an example of these types of windows.

Text terminal windows may permit interaction with text within a graphical interface.

A child window may open automatically or as a result of a user activity in a parent window, for example.

A message window, or dialog box, comprises a type of child window. These are usually small basic windows that are opened by a program to display content to a user and/or get content from a user. They usually have a button to be pushed.

Menus may allow a user to execute commands by selecting from a list of choices. Options may be selected with a mouse or other pointing device within a GUI, which may include a finger or stylus as well in some devices. A keyboard may also be used. Menus may be convenient to show commands that may be available.

A menu bar typically is displayed horizontally across the top of a window. A pull-down menu is commonly associated with this menu type. If a user clicks on a menu option, a pull-down menu may appear.

A menu may have a visible title within the menu bar. Its contents may be revealed if a user selects it with a pointer, for example. A user may then select items within the pull-down menu. If a user clicks elsewhere, content of the menu may disappear.

A context menu is usually invisible until a user performs a specific mouse or similar pointing type device action. Usually, a context menu may appear under the Cursor.

Menu extras are usually individual items within or at the side of a menu.

An icon refers to a small picture (e.g., a bit map) that represents objects, such as a file, program, web page, or command. They may be useful as a quick way to execute commands, open documents, and/or run programs, for example.

An interface component that a user interacts with may be referred to as a control (or a widget). Here are some non-limiting examples:

Window: refers to a paper-like rectangle that represents a "window" into a document, form, or design area, for example.

Text box: refers to a box in which to enter text or numbers.

Button: refers to an equivalent to a push-button as may be found on mechanical or electronic instruments.

Hyperlink: refers to text with some kind of indicator (usually underlining and/or color) that indicates that clicking the text will take one to another screen or page.

Drop-down list: refers to a list of items from which to select. The list normally displays items if a button or indicator is clicked.

List box: refers to a GUI control that allows a user to select one or more items from a list contained within a static, multiple line text box.

Combo box: refers to a combination of a drop-down list or list box and a single-line textbox, allowing a user to type a value directly into a control or choose from a list of existing options.

Check box: refers to a box which indicates an "on" or "off" state, such as via a check mark ☑ or a cross ☒. Sometimes may appear in an intermediate state (shaded or with a dash) to indicate mixed status.

Radio button: refers to a button, similar to a check-box, except that only one item in a group may be selected. Its name comes from the mechanical push-button group on a car radio receiver. Selecting a new item from a group of buttons also deselects the previously selected button.

Cycle button: refers to a button that cycles its content through two or more values, thus enabling selection of one from a group of items.

A tab is typically a rectangular box which usually contains a text label or graphical icon associated with a view pane. If activated the view pane or window may display controls associated with that tab; groups of tabs allow a user to switch quickly between different controls. Tabs are usually placed in groups at the top of a window, but may also be grouped on the side or bottom of a window. Tabs are also present in a settings pane of various applications. Windows, for example, uses tabs in many of its control panels.

A GUI may make an application easier or more practical, and/or more efficient to use. An interface comprises a mechanism by which individuals (e.g., users) and devices, such as a network device or computing device, communicate. A GUI comprises a visual operating display for a user of an application executing on a computing or network device. GUIs usually have common characteristics, such as windows, icons, menus, and/or push-buttons, collectively, as previously discussed, e.g., pictures that bring forth a certain action and/or an action space. A user may issue commands via a GUI to an application, as discussed previously. A GUI may also work via a network, which may allow a GUI display to be on a network device, such as a client, and an application to be on a server, as discussed herein.

In one embodiment, a computing device may include a GUI capable of being employed at least as a part of a process to generate a signal processing pipeline ("SPP"). A GUI may be operable to initiate a process resulting in generation of an SPP, for example, consistent with the foregoing discussion of graphical components and/or visual indicators. By way of non-limiting example, via a GUI, for example, interaction with one or more of the foregoing graphical components and/or visual indicators may take place. Examples include, for example, mouse operations (e.g., clicking, dragging, dragging and dropping, scrolling, hovering over, etc.), stylus and/or finger operations (e.g., touching, tapping, long holding, short holding, multi-touch operations including, but not limited to, pinching-and-zooming, etc.), audio-visual operations (e.g., voice recognition-type commands, gesture input, eye tracking, etc.), among others. As shall be elaborated in further detail hereinafter, use of a GUI including one or more of the foregoing graphical components and/or visual indicators via one or more of the foregoing operations, for example, may be beneficial so that generation of a SPP may be accomplished more quickly, with fewer resources, and/or with less expertise/know-how, among other things.

In one embodiment, a GUI for a computing device may, for example, provide icons and/or other GUI features, such as, for example, graphical components and/or visual indicators, that may, if selected, such as via a click, a hover over, and/or other user initiated actuation, designate one or more operations to be performed, such as with respect to one or more signal samples, for example. Likewise, similar GUI features may designate one or more locations from which to access stored signal samples and/or one or more locations in which to store processed signal samples. Thus, a GUI may be interacted with and/or otherwise manipulated, to indicate signal samples to be processed and/or one or more signal processing operations to be employed at least as part of signal processing to be executed.

In one implementation, one or more signal samples for processing via an SPP may come from a feed of signal samples. A feed of signal samples comprises a suitable form and/or format capable of storing and/or representing physical signals and/or states. Physical signals and/or states stored by a feed of signal samples may comprise binary signal values, analog signal values, digital signal values, or any combination thereof, by way of example. For convenience, the term "signal values" will be used hereinafter to denote binary signal values, analog signal values, digital signal values, binary digital signal values, etc. Furthermore, and also for convenience, the term feed of signal samples will be referred to interchangeably as a "feed," a "feed of values," a "feed of signals," a "feed of signal values," "feed of stored values" and/or a "feed of stored signal values," by way of example. In one or more embodiments, a feed of signal values may comprise and/or be stored in a database, such as a relational database, as a non-limiting example. By way of example, but not limitation, example feeds of signal values may include a feed of signal values related to user interactions on the Internet (e.g., advertisements viewed by one or more users, advertisements clicked on, content items viewed, IP address(es) of users, etc., user preferences, user demographics, electronic mail-related signals (e.g., keywords found in messages, contacts, etc.), content items (e.g., content for a website and/or web page, social media content, etc.)), by way of non-limiting example. It is likewise noted that a feed in some contexts may be referred to as a log, such as a log of browsing activities by a user, for example.

Similarly, in one implementation, one or more signals for processing via an SPP may be stored by one or more repositories. Like a feed of signal values, a repository stores signals and/or states. A repository and/or similar terms refers to a storage location for storing one or more signals and/or states and from which one or more signals and/or states may be managed. By way of non-limiting example, a repository may provide a schema for a feed of signal values, which may, for example, include format, indexing, structure, etc., as shall be discussed hereinafter. In this context, a schema comprises one example of a set of structured and/or semi-structured parameters. In particular, a schema comprises a variety of signal sample components having specified formats, such as, for example, tables, fields, views, indexes, etc. Thus, in this context, signal samples may substantially comply and/or be substantially compatible with one or more schema in which the schema include a particular format for signal samples, such as structured and/or semi-structured parameters.

A repository may, thus, store one or more signals and/or states comprising sample signals. For instance, if a feed of signal values comprises signals and/or states with respect to advertisements viewed by a set of users, as a an illustrative example, a repository may store one or more signals and/or states related to a subset of users of the feed of signal values. Further, in one implementation, a repository may be capable of updating one or more signals and/or states stored therein, such as, responsive to a determination that a schema of a feed of signal values has changed, as an example. Thus, in an embodiment, a repository may be capable of triggering one or more alerts related to signals and/or states stored therein, such as responsive to changes, for example.

By way of illustration, but not limitation, in one embodiment, a GUI for generating a SPP may further comprise one or more components capable of providing notifications and/or alerts beyond in connection with changes to a repository. For instance, one or more components of a GUI for generating a SPP may be capable of transmitting messages including, but not limited to, e-mails, short message service (SMS), and/or multimedia messaging service (MMS). As such, responsive to a query (e.g., with respect to a SPP, as explained in more detail later) and/or responsive to an error message, a message may be transmitted to users, such as to those employing a GUI to generate a SPP.

By way of a non-limiting example, a repository may comprise a feed of signal values substantially in accordance with a first schema, and one or more SPPs may receive one or more signal samples from the feed of signal values consistent with the first schema. However, if the first schema, for example, changes due, at least partly, for example, to an iteration of the feed of signal values, the repository may be capable of detecting the changes, updating the one or more signals stored in the repository and/or providing an alert (e.g., to those who designed and/or implemented the one or more SPPs), among other things. Thus, desirably, one embodiment of a repository may be capable of gracefully handling a change to a feed of signal values so that an SPP that uses a feed of signal values remains consistent, for example. Further, a repository may also, in one embodiment, be capable of storing a subset of signals and/or states stored in a feed of signal values, such as, for example, to provide a less dense, but nonetheless, substantial source for signal processing via a SPP.

In an embodiment, a GUI for generating a SPP maybe capable of displaying images and/or portions thereof to visually communicate a SPP to a user in accordance with user initiated manipulations of GUI features, for example. Thus, one or more repositories, one or more feeds of stored signal samples, and/or one or more signal processing operations, may be presented and/or communicated visually, using one or more graphical components and/or visual indicators, such as using icons, graphics, and/or other suitable visually displayable components, so as to communicate a SPP that has been formed substantially in accordance with user interaction and/or involvement, for example, as shall be discussed in detail further hereinafter.

To provide a few non-limiting examples here, in an embodiment of a GUI, such as for generating a signal processing pipeline, capabilities may include (but are not limited to): selection of one or more feeds of signal values and/or one or more repositories, which may, for example, comprise signal samples, such as of user browsing interactions, such as to be processed; selection of one or more particular stored signal samples, such as to be processed; selection of one or more signal processing operations; an arrangement and/or configuration, such as of selected repositories, operations, etc., such as to generate a signal processing pipeline, for example; and/or generation of code to implement an SPP, by way of example.

For example, browser interactions, such as user interactions, may be stored in the form of signal samples. In an illustrative embodiment, signal samples related to browsing activities, such as in connection with network views of advertisements (e.g., via the Web and/or the Internet), for example, may be collected and/or stored in a feed of signal values and/or a repository. Thus, again, as an illustration, a GUI may be used to generate a SPP, such as for processing of signal samples having a variety of formats that may not generally be able to interoperate in a convenient manner. As shall be discussed further hereinafter, therefore, use of an embodiment of a GUI, such as to generate a SPP, may offer a variety of benefits. By way of example, but not limitation, using a GUI to generate a SPP may use fewer resources, take less time, use less knowledge and/or know-how, etc. One potential benefit of employing approaches consistent with embodiments discussed herein and/or related subject matter relates to an SPP being able to be generated, expanded, modified and/or maintained yet still realize an associated reduced cost, such as in terms of time, expense, and/or technical depth, etc. in comparison with traditional, conventional and/or state of the art approaches to SPP generation. As will be discussed, additional benefits may also be present in an embodiment.

Possible benefits depending, of course, on particulars of an embodiment may include, for example, providing essentially a "turnkey" mechanism to generate a SPP of potentially Internet-wide scope with roughly little more than an amount of technical knowledge usually employed to operate a standardly available web browser on a standardly available computing device, for example, such as the amount of technical knowledge employed to code a web page using a WYSIWYG (an acronym for "what you see is what you get") programming environment, such as DREAMWEAVER and/or GOOGLE WEB DESIGNER, as illustrative examples. Thus, in an embodiment, a SPP may be generated via a GUI essentially as easily as it is to create a web page, use cascading style sheets ("CSS"), make one or more calls to a database, etc. using DREAMWEAVER, for example. As alluded, such embodiments, for example, may be of benefit to businesses, entities, or the like, that typically may not have resources to finance and/or maintain experts with know-how sufficient to design, code, and/or otherwise implement a SPP on even a modest scale. Likewise, as also alluded, such embodiments may leverage, for example, commonplace technical knowledge possessed by individuals, for example, such as those who may possess a passing familiarity with SPP technology (e.g., an amount of familiarity to develop a simple application, such as, for example, using a graphical application builder which may entail a small amount of coding), but little more. Of course, it is also appreciated that these are merely illustrative examples and it is not intended that claimed subject matter be limited in scope to examples provided merely for illustrative purposes.

Furthermore, in one or more implementations of claimed subject matter, use of a GUI to generate a SPP may employ fewer resources, whether financial, computing, or otherwise. For instance, in a case where designing, coding, testing (e.g., code verification), re-designing, re-coding, re-testing, re-re-designing, re-re-coding, re-re-testing, etc. may take days and/or weeks, if not more, use of a GUI to generate a SPP may take less time (e.g., hours or days, by way of non-limiting example). One benefit of using a GUI to generate a SPP may include combining designing and coding into essentially a common undertaking, in some situations, for example. For instance, a GUI may permit review of an underlying a design of a SPP, code may be generated without necessarily obtaining additional human involvement (e.g., after one or more GUI interactions to arrange components of a SPP, etc.), and generated code may be tested. To the extent that errors and/or bugs are detected, subsequent design and coding, again, may be combined in a process, thus, potentially improving on state of the art SPP design, coding, testing, and/or generation.

In an embodiment, as an example, although claimed subject matter is not limited in scope in this respect, to leverage commonly available technical knowledge and/or to reduce development time, as an example, at least one GUI may be provided, such as via a network device and/or a computing device, to generate a SPP. As shall become more clear, such as via non-limiting illustrative examples, by employing a GUI, also explained in more detail below, underlying technical complexity may be handled in a manner so as not to be a distraction or to be less of a distraction, for example, to a user, while providing a user a capability to design, develop, and/or generate a SPP in a manner that, in at least some embodiments, may be more aligned with cognitive human processes, for example. It is noted that subject matter scope is not intended to be limited to particular types of symbols, particular types of network displayed arrangements and/or configurations, particular types of GUI manipulations, and/or particular actions that may result from particular GUI manipulations. Rather, illustrative but non-limiting embodiments are provided herein.

A further benefit of an embodiment may potentially relate to particulars with respect to one or more schema, as an example. At times, one or more parameters of a feed of signal values may employ one or more uncommon schema (e.g., field or table names, form of signals, structure, etc.), for instance. As used herein, the term "parameter" and/or similar terms, such as "structured parameters" and/or "semi-structured parameters," for example, refers to signal samples descriptive of a collection of other signal samples, including specifying and/or otherwise describing signal sample format with respect to such other signal samples, such as for one or more electronic documents, as an example. Furthermore, parameters themselves exist in the form of physical signals and/or states, such as memory states and/or electronic transmission signals. For example, one or more parameters, such as referring to parameters with respect to an electronic document comprising a Web site, may comprise an embedded markup language, such as a version of HTML, XML, and/or CSS, for example (e.g., any version now known and/or to be developed later). As a further non-limiting example, a photographic image may include parameters, such as time of day at which a photographic image was taken, latitude and longitude of an image capture device, such as a camera, for example, etc. In another example, one or more parameters relevant to content comprising a technical article may include one or more authors, for example. Claimed subject matter is intended to embrace meaningful, descriptive parameters in the form of physical signals and/or states, which may include, as parameter examples, name of the an electronic document (e.g., file identifier), purpose of an electronic document, time and date of creation of an electronic document, logical path of an electronic document (or portion thereof), encoding formats and/or standards used for encoding an electronic document, and so forth.

It is noted that a schema comprises one example of a set of structured and/or semi-structured parameters in this context. In particular, a schema comprises a variety of signal sample components having specified formats, such as, for example, tables, fields, views, indexes, etc. Thus, in this context, signal samples may substantially comply with and/or be substantially compatible with one or more schemain which the one or more schema includes a particular format for signal samples, such as structured and/or semi-structured parameters.

Likewise, an illustrative embodiment may employ one or more feeds of signal values, such as interaction feeds, which as may be stored via one or more servers, as described below. By way of non-limiting example, interaction feeds may comprise one or more signals and/or states related to one or more user browsing sessions and provide one or more signal samples regarding user interaction with respect to one or more examples of content, such as may be available via the Internet (e.g., whether a user has visited a network resource (e.g., a web site), a time stamp and/or other indicator of time, an IP address of a user, etc.). Interaction feeds, as a feed of signal values (e.g., user preferences, user demographics, electronic mail-related signals (e.g., keywords found in messages, contacts, etc.), content items (e.g., content for a website and/or web page, social media content, etc.)), typically substantially comply with and/or are substantially compatible with one or more schema. Thus, interaction feeds comprise structured and/or semi-structured parameters substantially in accordance with one or more schema. In an embodiment of a SPP, typically one or more schema may be employed. It is noted that contemplation of use of appropriate schema is therefore desirable. For example, signal processing may not be effective and/or may be less effective otherwise.

Typically, generating a custom SPP comprises generation of code, such as code executable to access signal samples from a feed. By way of example, but not illustration, and as shall be shown hereinafter, determining a schema for a feed may comprise generation of code to, for example, scan the feed to determine one or more schema. In some cases, multiple feeds may comprise signal samples of interest, and thus, an undertaking to (1) generate code to infer one or more schema of multiple feeds of interest, and (2) execute generated code to infer one or more schema may be time- and/or resource-consuming. As such, there may be a desire to have an ability to infer and/or extract one or more schema from feeds without necessarily employing direct intervention from a human being).

Additionally, a process of inferring one or more schema and subsequent generation of a SPP may be error sensitive, perhaps as a result of being custom created. For instance, in one embodiment, one or more schema for a feed may be determined, and those tasked with generating a SPP may refer to, for instance, an electronic and/or hardcopy document describing the one or more schema. Thus, manual entry, for example, by those generating code for a SPP, may potentially increase a risk of one or more errors being introduced into generated code (e.g., typographical errors, etc.). As such, it may be that a process in which schema is extracted and/or inferred may reduce risk of user-error, by way of example.

Still further, in a case where specific signal samples are desired for a SPP, lack of knowledge as to a location of signal samples within a feed may also render generation of a SPP challenging. Thus, a method of discovering one or more feeds of signal values and/or finding signal samples within one or more feeds of signal samples may be desirable.

By way of non-limiting example, a schema crawler (e.g., embodiment 260), as shall be discussed in further detail below, may be capable of inferring a schema of a feed of signals. For instance, a schema crawler may infer a schema of a feed of signal values, such as without an interaction from a user other than via a GUI. By way of example, but not limitation, inferring schema with a schema crawler may be as easy as selecting one or more feeds of signal values. As such, a benefit of using a schema crawler to infer a schema of a feed of signal values, may include reducing or eliminating various instances of manual code generation For instance, in one embodiment, selection of one or more signal samples may be performed via a GUI so as to generate a signal processing pipeline, as shall be discussed in greater detail hereinafter. Further, a schema crawler may reduce manual entry in a variety of ways.

For instance, a GUI component may present a user with a query field into which a query may be entered to locate one or more signal samples. Alternatively, in an embodiment, one or more feeds of signal samples may be browsed, such as via a component of a GUI for generating a SPP, as illustrated by window 310 in FIG. 3B. Of course, the foregoing are presented by way of illustration, and not limitation, and are not intended to reduce the scope of claimed subject matter.

A variety of techniques exist to extract and/or infer one or more schema, such as from webpages that have been browsed, for example. It is noted that, in an embodiment, extraction and/or inference of one or more schema may take place without human involvement, such as substantially in accordance with an illustration provided below, as a non-limiting example. Thus, in an embodiment, structured and/or semi-structured parameters may be extracted and/or inferred from network resources, such as webpages, visited by users, for example. It is noted here, for convenience, that throughout this document the term "infer" and/or similar terms may be used generically to mean inference and/or extraction, as appropriate.

In one embodiment, appropriate schema may be extracted, and/or inferred, such as by scanning signal samples stored in a feed of signal values, for example. Alternately, in an embodiment employing a crawler, the crawler may infer and/or extract appropriate schema in connection with crawling and/or scanning a feed of signal values, for example. In an embodiment, and as discussed in greater detail, parameter extraction and/or inference may take place via one or more universal resource indicators (URI) so as to extract and/or infer structured and/or semi-structured parameters (e.g., event names, venue names, show times, addresses, and/or a wide variety of additional parameters) from one or more network resources, such as a Web page and/or Web site, for example. As mentioned, structured and/or semi-structured parameters may be extracted and may potentially be mapped to one or more schema and/or one or more schema may be inferred. As discussed below, Tables 1-5 (and the associated description) illustrate tracting and/or inferring schema by way of illustrative examples. Furthermore, a non-limiting pseudo-code embodiment for extracting and/or inferring one or more schema, for example, is provided. Thus, as mentioned, in an embodiment, extraction and/or inference may take place without necessarily employing human interaction, such as human editorial services, for example.

A method embodiment, 100, such as for generating a repository of signal samples, is illustrated in FIG. 1. At block 105, one or more feeds may be scanned.

At block 110 of FIG. 1, and based, at least in part, on scanning, one or more schema may be determined. Different methods of extracting and/or inferring schema exist. More specifically, a variety of schema inference and/or extraction processes are known to those skilled in the art; therefore, a significant amount of details in this regard is believed to not be needed here and may merely unnecessarily lengthen this document. Nevertheless, several relevant options are discussed below, briefly.

For example, some programming languages may include mechanisms for extracting and/or inferring one or more schema, such as from an electronic document, such as a Web page, for instance. By way of further example, a foundational paper discusses this in detail. See Geert Jan Bex et al., Inferring XML Schema Definitions from XML Data, VLDB '07, Sep. 23-28, 2007, Vienna, Austria. As Jan Bex et al. notes, previous methods arrived at "Document Type Definitions (DTDs for short)." These methods did not distinguish between occurrences of a corresponding name within different "categories." For instance, if <name> were to occur under both <customer> and <supplier>, the previous methods had difficulty distinguishing between such instances, since some text (such as in electronic form), for example, may have appeared to be the same, but functionally may have had different purposes. Thus, methods to extract and/or infer a more precise "XML Schema Definitions (XSDs for short)" came into being. Specifically, Jan Bex et al. identified use of context as an approach. Broadly speaking, context from other XML electronic documents was employed. As a simple illustration, if an electronic document having an item "hammer" had a productID="123456789," it may be that a schema type for productID comprises "Integer" or comprises "String," for example. Furthermore, if that particular electronic document uses only integers, it may be reasonably inferred that the schema type for productID comprises "Integer." However, if a subsequent electronic document has a productID="ABC 123," it may as a result be inferred instead that the schema type for productID comprises "String."

Furthermore, as noted above, some programming languages include support for schema inference and/or extraction. Thus, for those situations, it may be possible to write code that includes a call to, for example, a subroutine in which as a result of providing an electronic document, the subroutine is able to determine its schema. For instance, in one example, involving an object-oriented programming language, an object may comprise a location in memory in which the memory location contents, which may comprise one or more physical states, has a particular value. Object-oriented programming languages use classes, which are, generally speaking, templates capable of processing an object, which may be stored in memory, for example, and return the object after having been processed. By way of non-limiting example, the .NET framework, developed by Microsoft, is a relatively common environment for developing software applications, products, etc. and that includes an XmlSchemaInference class for inferring an XML schema from an XML electronic document. That is, a XmlSchemaInference class in the .NET framework is capable of processing one or more XML electronic documents and returning one or more objects comprising a schema of the one or more XML electronic documents.

By way of illustrative example, two sample XML electronic documents may comprise the following:

TABLE 1

EXAMPLE XML ELECTRONIC DOCUMENT 1 ("ITEM1.XML")

<?xml version="1.0" encoding="utf-8"?>
<item xmlns="http://www.contoso.com/items" productID="123456789">
  <name>Hammer</name>
  <price>9.95</price>
  <supplierID>1929</supplierID>
</item> and

TABLE 2

EXAMPLE XML ELECTRONIC DOCUMENT 2 ("ITEM2.XML")

<?xml version="1.0" encoding="utf-8"?>
<item xmlns="http://www.contoso.com/items" productID="A53-246">
  <name>Paint</name>
  <price>12.50</price>
</item>

Likewise, the following illustrative pseudo-code may be capable of inferring schema for two XML electronics documents, item1.xml and item2.xml, such as within the .NET framework.

TABLE 3

EXAMPLE PSEUDO CODE 1

XmlReader reader = XmlReader.Create("item1.xml");
XmlReader reader1 = XmlReader.Create("item2.xml");
XmlSchemaSet schemaSet = new XmlSchemaSet( );

TABLE 3-continued

EXAMPLE PSEUDO CODE 1

```
XmlSchemaInference inference = new XmlSchemaInference( );
schemaSet = inference.InferSchema(reader);
// Display the inferred schema.
``` to an "Integer" (e.g., Int) type. However, after XmlSchemaInference( ) executes with item2.xml and encounters productID="A53-246," as was described previously, its inference will be changed to conclude that schema type here comprises "String." Tables 4 and 5 illustrate schema 1 and schema 2, consistent with the prior description.

TABLE 4

Schema 1

```
<?xml version="1.0" encoding="utf-8"?>
<xs:schema attributeFormDefault="unqualified" elementFormDefault="qualified"
targetNamespace="http://www.contoso.com/items"
xmlns:xs="http://www.w3.org/2001/XMLSchema">
<xs:element name="item">
<xs:complexType>
<xs:sequence>
<xs:element name="name" type="xs:string" />
<xs:element name="price" type="xs:decimal" />
<xs:element name="supplierID" type="xs:unsignedShort" />
</xs:sequence>
<xs:attribute name="productID" type="xs:unsignedInt" use="required" />
</xs:complexType>
</xs:element>
</xs:schema>
```

TABLE 5

Schema 2

```
<?xml version="1.0" encoding="utf-8"?>
<xs:schema attributeFormDefault="unqualified" elementFormDefault="qualified"
targetNamespace="http://www.contoso.com/items"
xmlns:xs="http://www.w3.org/2001/XMLSchema">
<xs:element name="item">
<xs:complexType>
<xs:sequence>
<xs:element name="name" type="xs:string" />
<xs:element name="price" type="xs:decimal" />
<xs:element minOccurs="0" name="supplierID" type="xs:unsignedShort" />
</xs:sequence>
<xs:attribute name="productID" type="xs:string" use="required" />
</xs:complexType>
</xs:element>
</xs:schema>
```

TABLE 3-continued

EXAMPLE PSEUDO CODE 1

```
Console.WriteLine("Original schema:\n");
foreach (XmlSchema schema in
schemaSet.Schemas("http://www.contoso.com/items"))
{
schema.Write(Console.Out);
}
// Use additional content in item2.xml to refine the original schema.
schemaSet = inference.InferSchema(reader1, schemaSet);
// Display the refined schema.
Console.WriteLine("\n\nRefined schema:\n");
foreach (XmlSchema schema in
schemaSet.Schemas("http://www.contoso.com/items"))
{
schema.Write(Console.Out);
}
```

Thus, the foregoing provides an illustration, albeit a simplified example, as to how a schema may be inferred and/or extracted from an electronic document, for example. Indeed, in one embodiment, a XmlSchemaInference( ) class will execute with item1.xml and will encounter productID="123456789," and determine, at least because 123456789 comprises integers, that productID corresponds The foregoing simplified illustrative examples are provided by way of example, and are not to be taken in a limiting sense. Further, in at least some cases, a schema may be explicitly provided so that schema inference and/or extraction may thus be unnecessary. That is, there may be no need to run one or more schema inference/extraction subroutines, such as if a schema, for example, is explicitly provided.

Of course, while schema is discussed above in terms of XML, schema may be inferred and/or extracted for many other types of electronic documents. For example, JavaScript Object Notation (JSON) comprises an alternative to XML for use between a server and a web application, for example. JSON schema may be inferred and/or extracted using methods similar to those discussed above. Thus, consistent with the foregoing, context may be used to identify and refine a schema, for example.

Returning to FIG. 1, at block 115 and based, at least in part, on a determined schema, one or more repositories may be generated. Thus, at block 115, one or more signals corresponding to a schema of, for example, an electronic document, may be stored in one or more repositories.

For example, Table 6 includes pseudo-code to generate a repository, such as related to an inferred schema.

TABLE 6

Repository SQL Code

```
DROP TABLE IF EXISTS 'feeds';
CREATE TABLE 'feeds' (
'id' int(10) unsigned NOT NULL AUTO_INCREMENT,
'path' varchar(1024) DEFAULT NULL,
'trigger_path' varchar(128) DEFAULT NULL,
'sample_data' text,
'schema_data' text,
'description' varchar(4096) DEFAULT NULL,
'freq' varchar(64) DEFAULT NULL,
'file_count' int(10) unsigned DEFAULT NULL,
'feed_size' varchar(255) DEFAULT NULL,
'sample_data_path' varchar(128) DEFAULT NULL,
'seed_path' varchar(128) DEFAULT NULL,
'schema_data_path' varchar(128) DEFAULT NULL,
'owner' varchar(64) DEFAULT NULL,
'retention' varchar(64) DEFAULT NULL,
'permission' varchar(64) DEFAULT NULL,
'cluster' varchar(64) DEFAULT NULL,
'hdfs_proxy' varchar(64) DEFAULT NULL,
'created_at' timestamp NOT NULL DEFAULT CURRENT_TIMESTAMP ON
UPDATE CURRENT_TIMESTAMP,
'updated_at' timestamp NOT NULL DEFAULT '0000-00-00 00:00:00',
PRIMARY KEY ('id')
);
```

Consistent with the foregoing discussion, for example, in one embodiment, one or more electronic documents may be crawled and/or scanned by a schema crawler to determine one or more schema. By way of illustrative embodiment, one or more electronic documents may be provided to a user-defined function (UDF) and/or class (e.g., XmlSchemaInference( ) as discussed above), for example. One or more signal samples may be returned by the UDF and/or class in this example, and may be stored in one or more repositories, such as may, for example, be generated based at least in part on the pseudo code of Table 6. In this non-limiting example, a repository may be populated with, for instance, an ID number, a path, sample signals, schema details, permissions, time stamps, etc. by way of non-limiting example.

Thus, in an embodiment, as an example, instructions on a storage medium may be executable by a computing device, for example, to: (1) scan one or more feeds (e.g., 105), (2) determine a schema for the one or more feeds (e.g., 110), and (3) generate one or more repositories having the determined schema therein (e.g., 115), by way of non-limiting example.

Figure 2:
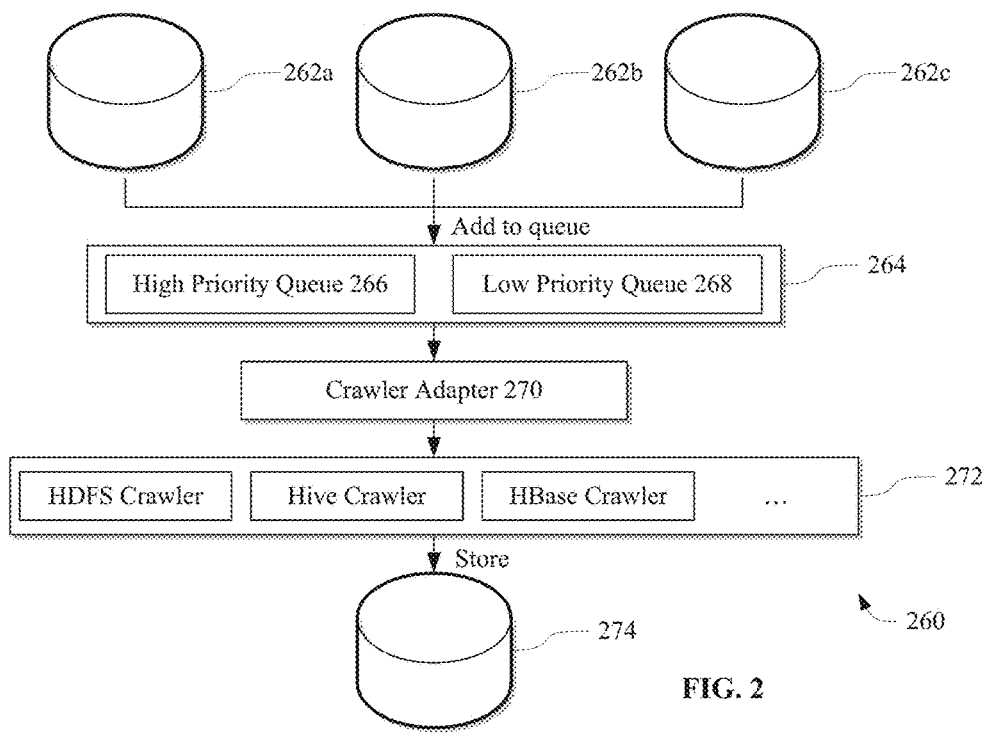
FIG. 2 illustrates one example of an embodiment of a crawler.

A schema crawler in general comprises instructions executable on one or more computing devices capable of performing, for example, in an embodiment, blocks 105, 110, and 115 of FIG. 1. For example, in an embodiment, a schema crawler may implement a process, as discussed above, to determine one or more schema. FIG. 2, for example, illustrates an embodiment 260 that includes a schema crawler. Embodiment 260 is depicted as also comprising one or more feeds of signals values to be processed, such as, for example, 262a-262c.

As was discussed above, in relation to Jan Bex et al., as a corpus of feeds of signal values may grow over time, so too may accuracy of a schema inference system. That is, as a result of using context, such as may be provided by a plurality of feeds of signal values, a large sample size of feeds of signals values may, for example, be of use in connection with a schema crawler, that may refer to such feeds to infer/extract one or more schema. However, computation a overhead and/or other types of resource overhead may likewise be incurred to maintain a large sample of feeds. Thus, it may be desirable to have an approach for streamlining a schema inference process. Furthermore, a 'so-called' bulk scanning and/or crawling process may also potentially be less efficient in terms of inferring schema, since such an approach may simply execute as needed without any load balancing management. However, as an alternative, in one embodiment, it may potentially be more efficient to prioritize some aspects of inference with respect to one or more schema (e.g., an ID, a type, etc.) and address other aspects of inference with respect to one more schema with a lower priority.

For example, in an embodiment, improving efficiency and/or reducing bandwidth usage of a schema crawler may be desired. One method may comprise use of a prioritized queue. For instance, in an embodiment, referring to FIG. 2, signal samples from feeds 262a-262c may be queued, such as via 264. As illustrated, queue 264 may comprise a high priority queue 266 and/or a low priority queue 268.

As discussed above, a schema may be inferred by reference to a plurality of feeds (e.g., using contextual indicators). As illustrated above (e.g., Tables 1-5), one potential method for inferring schema may comprise scanning a feed of signal values in its entirety, inferring one or more schema as a result, scanning a second feed of signals values and determining whether the previously inferred one or more schema is consistent with one or more schema inferred from the second feed of signal values. However, as was suggested, this approach for inferring schema may be inefficient in some cases.

By way of non-limiting example, in one embodiment, it may alternatively be more efficient to scan the first and second feeds of signal values (e.g., in part or entirety); queue potentially corresponding aspects substantially according to a common priority; compare the potentially corresponding aspects, such as, according to the common priority; and infer one or more schema based at least partly on the comparison. This approach, for example, may potentially render inference of one or more schema more efficient by potentially reducing and/or eliminating unnecessary read and/or write processes, such as to one or more repositories, for example In one non-limiting embodiment, one or more signals from feed 262a may be scanned. It may be determined, for instance, that processing some signal samples are to be prioritized over others. Thus, queue 264 (and, in one non-limiting case, high priority queue 266 and/or low priority queue 268) may be populated with one or more signal samples from feed 262*a*. Feed 262*b* may be scanned and relevant portions of feed 262*b* may be identified, such as, by way of example, to correspond to one or more of the one or more signal samples from feed 262*a* in queue 264. In one non-limiting embodiment, one or more signal sample samples of feed 262*b* may be queued in a manner to be consistent with the queuing substantially accorded to feed 262*a*. Feed 262*c* may also be scanned, and one or more signal samples assigned a priority in queue 264, for instance, as well. Of course, in alternative embodiments other potential queuing strategies may be employed. For instance, as one example, one or more signal samples from feed 262*a* may be assigned to high priority queue 266 based, at least in part, on a chronological order of scanning (e.g., first-in, first-out (FIFO)), by way of non-limiting example.

Referring to FIG. 2, in one embodiment, crawler adapter 270 may be capable of determining and/or otherwise participating in determination of one or more schema for one or more feeds of signal values (e.g., feeds 262*a*-262*c*). In one non-limiting example, for instance, one or more parameters including, but not limited to, read permissions, space and/or size determinations, and/or write and/or read executions with respect to a feed of stored signal values, among other things, may be based, at least in part, on a crawler adapter, such as 270, for example, as follows. In an embodiment, a crawler adapter may comprise instructions, for example, executable by one or more computing devices to operate as an intermediary between queue 264 and crawlers 272.

Thus, for example, crawler adapter 270, based at least in part on signal samples of one or more feeds of signal values, may be capable of making a determination regarding an appropriate crawler to be used to infer one or more parameters (e.g., of a schema) from a feed of signal values. By way of illustration, many different forms of feeds exist and may continue to be developed in the future. However, at least in some cases, several feeds may use similar and/or related syntax, semantics, structure, etc. Nevertheless, likewise, differences in syntax, semantics, structure, etc. between feeds may render crawling, such as, to determine one or more schema, more challenging. Therefore, in an embodiment, crawlers specific to various schema may be desirable in some cases. Thus, in one embodiment, for example, crawler adapter 270 may be capable of determining which of crawlers 272 may be more appropriately suited for a particular feed of signal values, for example.

By way of example, HDFS refers to a relatively common file structure, written in Java, and operable with a Hadoop distributed computing system. In at least some embodiments, a HDFS feed may be accessed using a language, "Pig Latin" that, while similar to SQL, comprises several differences. Hive, by way of a further example, refers to a relatively common file structure, that while also similar to SQL, comprises differences. Additionally, HBase refers to a well-known non-relational database. HBase, not surprisingly, is different from SQL, HDFS and Hive. Therefore, it may be desirable to have one or more crawlers specific to certain types of feeds, such as, for instance, an HDFS crawler, a Hive crawler, a HBase crawler, etc., to be used, if appropriate, to determine one or more parameters for a feed of signal values (e.g., of a schema) using, for example, a schema inference and/or schema extraction approach, such as described above. It is noted that while crawlers 272 are discussed in relation to HDFS, Hive, and/or HBase, claimed subject matter is not so limited. Indeed, the foregoing is merely presented by way of illustrative example. Any number of additional feeds (and/or types thereof) are contemplated, as indicated by the ellipses in crawlers 272. For instance, other suitable crawlers may include a Cassandra crawler (e.g., Cassandra refers to an open-source distributed relational database management system, encompassing past, present, and future versions), a general relational database crawler, and/or a crawler for other database management systems, without limitation. Furthermore, in this context, HDFS, Hive, and HBase are intended to encompass past, present and future versions of HDFS, Hive and HBase. In an embodiment, as alluded to above, crawler adapter 270 may be capable of determining an appropriate one of crawlers 272 for use with respect to feeds 262*a*-262*c*, for example. Embodiment 260 may also generate one or more repositories, such as 274, for example, consistent with the foregoing discussion of repository generation.

As it may be used in relation to a GUI for generating a SPP, a schema crawler may operate in a number of possible ways, for an embodiment. For instance, in one illustrative embodiment, it may be desirable to have a GUI display one or more parameters as to one or more feeds (e.g., of a schema, etc.) after startup, such as, for example, in the form of one or more graphical components and/or visual indicators showing parameters of one or more feeds of signal values (e.g., of a schema). As such, a schema crawler, such as embodiment 260, may operate in the background, such as without prompting from a user. Thus, in an embodiment, processes of a schema crawler may be executed, for example, on one or more different networked devices (e.g., servers, etc.), so as to not be apparent via a GUI of a networked device, for example, etc. A schema crawler running in the background may beneficially allow near immediate access to parameters of one or more feeds of signal values (e.g., of a schema) without necessarily having to wait for a schema crawl process to complete, for example. Additionally, a schema crawler running in the background may include, among other things, scheduling capability to allow it to, by way of non-limiting example, scan one or more feeds of signals values at scheduled times and/or frequencies to, among other things, potentially identify changes in parameters of one or more feeds of signal values, such as, for instance, changes as to a schema of a feed of signals values used, at least in part, by a SPP. Of course, claimed subject matter is not necessarily restricted to background operation. Indeed, foreground operation, such as, in response to user interaction (e.g., one or more commands to initiate a crawl of a feed of signals values) is also contemplated, by way of non-limiting example, and intended to be included within claimed subject matter.

Figure 5:
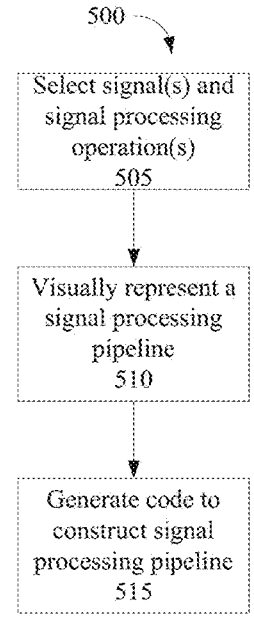
FIG. 5 is a flow chart illustrating yet another example of a method embodiment.

Returning to generating a SPP, as was noted above, traditional methods of SPP generation are time- and/or computing-intensive. For instance, atypical process of designing, coding, and/or testing (e.g., verifying) a SPP may take substantial time (e.g., days and/or weeks) and/or know-how. Further, as mentioned above, generating a SPP via a GUI substantially in accordance with claimed subject matter may potentially reduce resources expended and/or reduce level of know-how needed. With the preceding discussion in mind, an illustrative method embodiment is presented by way of overview of generation of a SPP via a GUI. Thus, FIG. 5 illustrates a method embodiment 500 for generating a SPP.

In one embodiment, a SPP, consistent with the foregoing discussion of SPPs, may be generated via a GUI. As was discussed above, one or more repositories and/or feeds of signal values may be accessed from a computing device, such as, for example, via a GUI. Typically, searching for relevant content (e.g., one or more signal samples), such as within a feed of signal samples, may present challenges, particularly as size of a feed of signal samples increases. For large accumulations of signal samples, for example, it may become increasingly difficult to locate content of particular interest. One approach in an embodiment to facilitate locating desired content, such as signal samples, which may be stored in one or more repositories, for example, comprises generation of an index, such as an index of a feed of signal samples, as is commonly done in connection with generation of a database, for example. To illustrate, a feed of signal samples may be indexed in a variety of ways (e.g., user ID, date/time of interaction, etc.). Thus, searching capability to locate content of interest may be provided in an embodiment. Furthermore, a searching capability may be relatively easily expanded via existing approaches to provide a query capability in which queries may be generated and executed over one or more repositories, as desired.

For instance, if a SPP is desired for processing one or more signal samples related to a user interaction, such as, for example, a user interaction with an advertisement, a GUI may be used to locate one or more signal samples in a feed of interactions and/or a repository, based, at least in part, on one or more schema, illustrated, for example, by block 505 of method embodiment 500. By way of non-limiting example, one or more feeds of signal values and/or one or more repositories may be selected via a GUI using, for instance, one or more graphical components and/or visual indicators. Further, a search, such as via a query, for example, may be performed on one or more feeds of signal values and/or one or more repositories in order to further facilitate generation of a SPP. For example, in one embodiment, one or more icons corresponding to one or more feeds of signal values, one or more repositories, one or more signal samples, or a combination thereof, may be arranged within a window of a GUI, by way of non-limiting example. A GUI may further present an opportunity to interact with one or more feeds of signal values and/or one or more repositories, such as via a search query, for example, to locate desired content in the form of signal samples, such as previously described In another embodiment, other GUI components may be used including, but not limited to, one or more menus, one or more buttons, one or more hyperlinks, one or more drop-down lists, one or more list boxes, one or more combo boxes, one or more check boxes, one or more radio buttons, one or more cycle buttons, one or more tabs, etc.

In one embodiment, one or more graphical components and/or visual indicators of a GUI may be capable of being actuated via one or more interactions including, but not limited to, a mouse click, a mouse hover, a scroll, a drag-and-drop, a finger and/or stylus interaction, such as, by way of example, touch, long and/or short hold, pinch and zoom, and/or other audio-visual interaction including, but not limited to, speech recognition and/or eye tracking, by way of illustration but not limitation. As such, in one embodiment, a user may interact with one or more graphical components and/or visual indicators, such as, to select a feed of signal values, a repository, and/or one or more signal samples (e.g., a field, a table, etc.). In one non-limiting example, an icon corresponding to one or more signal samples may be selected and further employed, by way of example but not limitation, by clicking and dragging it from a first window to a second or clicking and dragging it from a first portion of a window to a second portion of the window, by way of non-limiting example. Furthermore, in an embodiment, one or more operations may be selected, such as, for example,  via a GUI. As has been discussed, a SPP may comprise one or more operations to process signal samples, such as, for example, from one or more feeds of signal values and/or one or more repositories, such as was discussed previously. In one embodiment, possible operations may include, but are not limited to, a selection operation, a join operation, a filter operation, a group by operation, a counting operation, and/or one or more user-defined functions (UDF), by way of non-limiting example. Thus, to illustrate, a GUI may present one or more operations in a window, and also may present one or more feeds of signal values, repositories, and/or signal samples. Likewise, a GUI may be operable to permit interaction with one or more graphical components and/or visual indicators to select one or more operations and/or one or more signal samples, by way of non-limiting example. The foregoing is but one illustrative embodiment consistent with block 505 in FIG. 5.

In one embodiment, a GUI for generating a SPP may be capable of indicating a relationship between one or more selected signal samples (e.g., from a feed of signal values) and one or more operations (e.g., a join operation). To illustrate, after selection of the one or more operations and one or more signal samples, as previously discussed, a user may specify a relationship, such as, by way of example, between the selected one or more operations and the selected one or more signal samples, via actuation of the GUI, for example. Thus, for the case of a selected join operation, as an example, two or more signal samples may be indicated for a selected join operation. Thus, a relationship may be indicated via one or more interactions with the GUI, such as, for example, drawing lines between GUI components, "touching" components, indicating a relationship via a menu or list, etc. By way of non-limiting example, SPP 304b illustrated in FIG. 3B providesa non-limiting example of specifying a relationship between an operation and one or more signal samples.

For example, one or more signal samples may be selected from a feed 340a of user interactions, such as, in one case, AdViews (e.g., one or more signal samples indicating ads that users have viewed); one or more signal sample may be selected from a feed 340b of user interactions, such as, in one case, SearchVolume (e.g., one or more signal sample indicating search terms used by users, such as, via a search engine); and operation 342, for example, may comprise a join operation, such as is consistent with, for example, SQL terminology. For convenience, a combination of one or more signal samples (such as, for example, feeds 340a, 340b) and one or more operations (such as, for example, join operation 342a) is referred to as a signal processing operation.

Figure 3A:
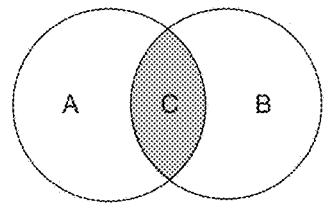
FIG. 3A is a Venn diagram.
Figure 3B:
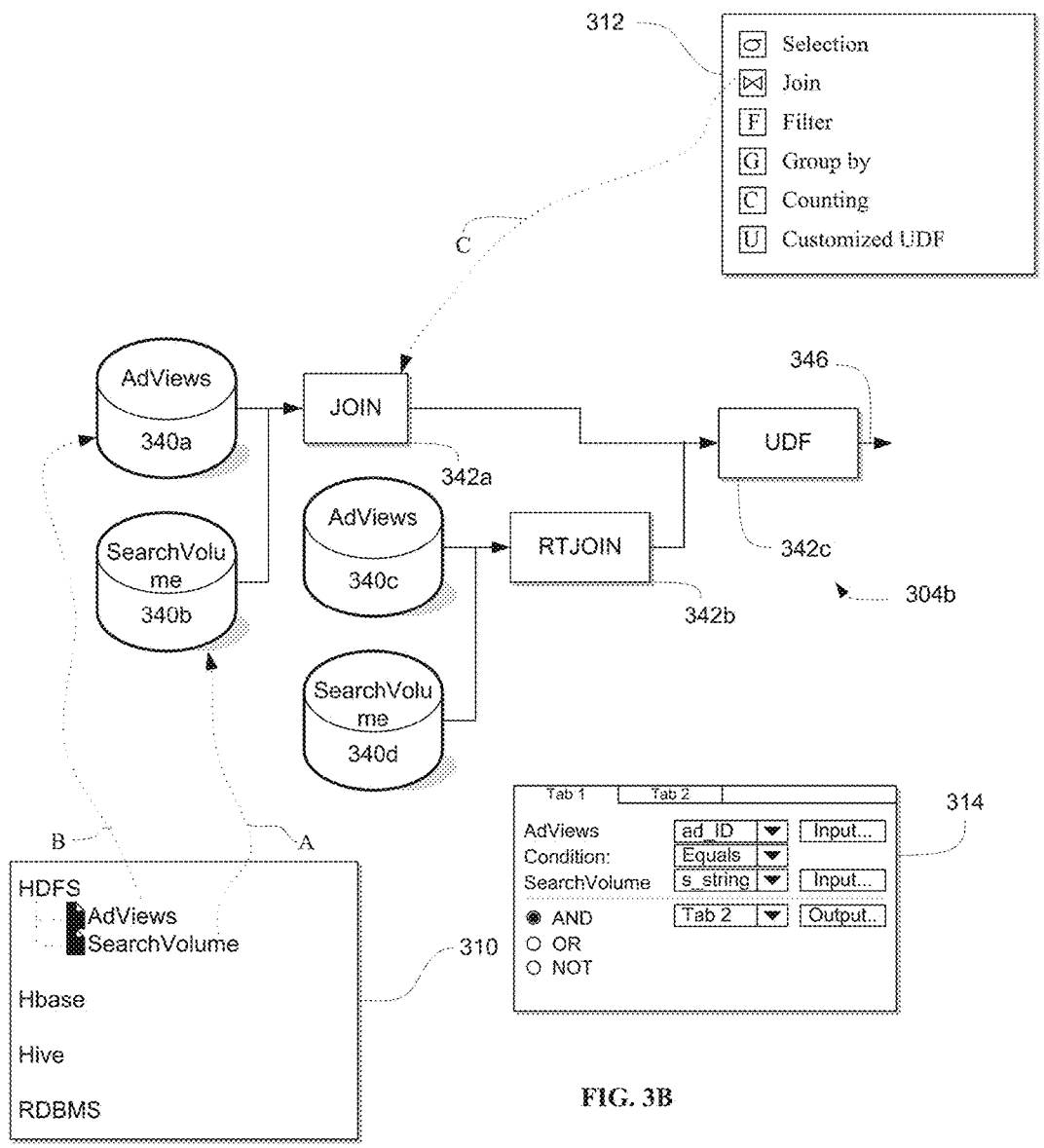
FIG. 3B is a block diagram illustrating an embodiment of a signal processing pipeline.

Returning to FIG. 5, at block 510, as alluded to previously, a GUI may be capable of, for example, via one or more graphical components and/or visual indicators, providing a visual instantiation (e.g., rendition) of a SPP, such as, for example, as illustrated in FIG. 3B, (e.g., SPP 304b). Also as described above, a visual instantiation of a SPP via a GUI may be in response to one or more interactions with the GUI, such as, by way of non-limiting example, a click, a mouse hover, a drag and drop, a finger and/or stylus action (e.g., touching, tapping, short or long touches, pinch and zoom, etc.), and/or an audio-visual actions (e.g., speech recognition, eye tracking, etc.). In one implementation, a signal processing operation comprising one or more signal samples and one or more operations may be selected, such as via a GUI (e.g., block 505), and responsive to the selection(s), one or more signals may be processed, which may include being transmitted and/or received, so as to display the particular signal processing operation. In one embodiment, one or more signal processing operations may be combined so as form a SPP, and, in an embodiment, an instantiation of the SPP may be generated for visual consumption, for example (e.g., on a display).

Again, returning to FIG. 5, and continuing, at block 515, code may be generated that, if executed, may implement a SPP, such as illustrated in FIG. 3B (e.g., SPP 304b). In one embodiment, code may be generated without additional human involvement beyond GUI actuation. That is, responsive to selections via a GUI, as discussed above, a SPP may be formed and after being formed, code to implement the SPP form may be generated without necessarily requiring a user command to do so. However, in other embodiments, code may be generated responsive to a user command (e.g., responsive to a button click, etc.).

As was mentioned above, a timing and/or order of processing of signal samples of a SPP may be of interest. By way of illustrative example, if a SPP comprises a chain of tasks, say A, B, C, and D, some tasks may be undertaken more efficiently before others, and some tasks may be undertaken in parallel with other tasks to streamline the SPP. Thus, in one illustrative case, task A may be undertaken prior to commencing B (e.g., because an output of A may be used as an input at B), and meanwhile, C may be undertaken concurrently with A, but prior to B (e.g., because an output of C may also be used as an input at B). Similarly, task D may not be completed prior to completion of task B (e.g., because an output of B may be used as an input of D). The foregoing example may be illustrated as follows:

In one embodiment, code generated to implement a SPP may comprise managing signal processing timing and/or order, by way of example, such as in accordance with well-known approaches. By way of example, but not limitation, one well-known approach for managing processing of a SPP may comprise a workflow management system. There are currently several international standards-setting bodies related to workflow management, and claimed subject matter is not restricted to any one particular form of workflow management, whether past, present, or future forms thereof. One known workflow manager comprises Apache Oozie (see, e.g., oozie.apache.org), which comprises a workflow scheduler to enable management of tasks, sometimes referred to as 'jobs,' across a distributed network of computing devices running Hadoop, by way of example. As is known, Oozie supports multiple types of jobs (e.g., MapReduce, Pig, Hive, etc.). Other workflow schedulers/managers for Hadoop include, but are not limited to, Hamake, Azkaban, and Cascading, and may be used, such as relative to a SPP, and may manage timing and/or order of signal processing. Past, present, and future versions of Oozie, Hamake, Azkaban, and Cascading workflow managers may be usable to manage processing of a SPP, without limitation. Additionally, while workflow management with respect of Hadoop has been discussed, claimed subject matter is not to be limited to Hadoop, and encompasses Spark, Presto, Cluster Map Reduce, Cloud MapReduce, among others, and/or other corresponding workflow management/scheduling systems, without limitation. As should be apparent, it may be desirable for a GUI, such as for generation of a SPP, to integrate with a given workflow manager so as to effectively process one or more signal samples.

In one embodiment, a GUI for generating a SPP may be capable of generating code usable by a desired workflow scheduler. For instance, as was mentioned above and shall be discussed in further detail hereinafter, in one non-limiting example, code may be generated, such as without interaction from a user other than via a GUI, to execute a SPP. Generated code may be transmitted to a workflow manager (e.g., Oozie). Without limitation, a workflow manager may be capable of deploying generated code to one or more platforms, such as server platforms (e.g., Hadoop, etc.), tasks of the SPP may be scheduled, and execution thereof may be monitored, such as by a workflow manager. In one embodiment, a GUI for generation of a SPP may be able to generate workflow manager-specific code to facilitate deployment of a SPP.

For an embodiment, block 515 is illustrated further in detail below, through an example.

In one non-limiting example, one or more signal processing operations may be performed in connection with a marketing evaluation, such as is explained below. For example, a type of operation referred to as "Lift" may be employed in connection with searches for purposes of marketing evaluation. This approach is referred to here as SearchLift. In SearchLift, measuring effectiveness of an advertising campaign may be evaluated using one or more feeds of signal values related to searches using, for example, a search engine. For example, one may evaluate whether or not an increase in search volume associated with keywords related to an advertising campaign has occurred as a way to measure effectiveness of an ad campaign. For example, an advertising campaign related to a keyword, A, may see a corresponding increase in search volume on keyword A. If so, an advertising campaign may be assumed to be likely to have had a desired effect with respect to user behavior; furthermore, a size of an effect may likewise potentially be quantified; a greater volume of searches may indicate greater effectiveness. That is, a greater volume of searches may indicate that user behavior has been affected to a greater extent, which is typically desirable.

As used herein, SearchLift refers to an evaluation of feeds to quantify a ratio of a proportion of search queries relevant to an advertising campaign submitted by users who were exposed to the ad campaign on the one hand, and a proportion of search queries related to an advertising campaign submitted by users who were not exposed to the ad campaign on the other hand. This ratio of proportions may be described mathematically as the ratio of eff(T), where T represents the group of users exposed to the ad campaign and eff(T) represents a proportion of the search queries that were relevant to the advertising campaign, to eff(C), where C represents the group of users not exposed to the ad campaign and eff(C) represents a proportion of a proportion of search queries by C that were also relevant to the advertising campaign. Thus, SearchLift may be described as:

$$Searchlift = \frac{eff(T)}{eff(C)}.$$

If, for this example, it is assumed that eff(x) is quantified and bounded between 0 and 1, SearchLift may yield a result greater than or equal to 1 as an estimate of effectiveness of an advertising campaign increases. That is, if an advertising campaign is effective, it may be assumed that group T will have a greater proportion of relevant search queries than will group C, which was not exposed to the campaign.

Feeds, denoted by AdViews (or "A" for short) in FIG. 3A, may be scanned to determine those users who viewed an ad campaign, as an illustrative example. Additionally, feeds, denoted by SearchVolume (or "B" for short) in FIG. 3A, may likewise be scanned to determine those users who searched on keywords related to an ad campaign. Thus, in this example, evaluating effectiveness of a campaign may comprise determining a number of users who viewed an ad campaign-in-question and searched on related keywords.

Thus, in this example, feeds A and B may include entries for an overlapping set of users (e.g., an intersection of users). Thus, feed A may include a first set of users, and feed B may include a second set of users. An overlap or intersection of sets of users, comprising users found in A and found in B, is represented by an overlapping portion C, of circles in the Venn diagram in FIG. 3A.

FIG. 3B illustrates SPP embodiment 304b, such as may be generated using a GUI, for example. Thus, AdViews 340a and SearchVolume 340b, may correspond to feeds A and B, as discussed. One or more signal samples in AdViews 340a and SearchVolume 340b may be selected, such as via a GUI. That is, via a GUI, selection of, for instance, AdViews 340a and SearchVolume 340b, and, likewise, selection of a subset of signal samples of AdViews 340a and SearchVolume 340b, may be made. In one illustrative example, for instance, a subset of signal samples of AdViews 340a related to advertisement views may be of interest. For example, but not by limitation, selection of signal samples related to users to whom an advertisement with an ID of '1234' has been shown (in this case, an advertisement with an ID of '1234' refers to an advertisement by Honda, for example) may be made. This selection may be accomplished, such as, via an interaction with a GUI menu and/or list, among other things. Similarly, via a GUI, selection of signal samples from SearchVolume 340b, which comprises signal samples related to user searches (e.g., search queries, user ID, IP addresses, etc.), may be made. For instance, a subset of signal samples related to searches including the string 'honda' may be desired, and selection of this subset of signal samples may be made via a GUI, such as via a menu, button, list, or other graphical component and/or visual indicator. Furthermore, an operation may be selected, again, via a GUI, by way of limiting example, operation 342a, for example, corresponding to a join operation, may be selected.

Signal processing operation(s) comprising AdViews 340a, SearchVolume 340b, and join operation 342a may yield an intersection of feeds 340a and 340b, as illustrated by intersection C in FIG. 3A. Practically speaking, signal processing may assess those users that viewed ad '1234' and that also searched using the 'honda' search string. In one non-limiting embodiment, the identity of users falling into the intersection may not be of interest. Instead, a count of users having viewed ad '1234' and having searched using 'honda' may be desired. As such, in one embodiment, a count operation may be selected via a GUI. By way of illustrative example, in one embodiment, a GUI may support, for instance, one or more interactions to select a "COUNT" operation at join operation 342a, such as via a drop-down-list. And as indicated above, responsive to visual display of SPP 304b, code may be generated. In this example, Table 7 below comprises pseudo-code with respect to signal processing to be employed here, for this illustration. In one implementation, code, such as, for example, the pseudo-code of Table 7, may be generated without additional human involvement including, for example, without a command being issued by a user.

TABLE 7

Intersection Pseudo-Code

SELECT
COUNT(DISTINCT f.user)
FROM adviews f JOIN search g
ON
f.user = g.user
AND
f.ad_id = 1234
AND
g.s_string = 'honda';

Additional computation may be desirable in this example, however. In one embodiment, an intersection of A and B alone may not provide a meaningful indication of effectiveness of an ad campaign. For example, for a SearchLift evaluation, it may be desirable to compare a number of searches for ad related keywords to an overall number of searches (e.g., fromfeeds). An overall number of searches is shown in FIG. 3A as a right side circle, referred to as B in FIG. 3A.

Since A∩B has been measured, to compute B, a computation of a right outer join (B/A) may be performed. Thus, in this example, an overall number of searches, B, comprises a sum of A∩B and (B/A). As illustrated by FIG. 3B, a right outer join may correspond to signal processing comprising AdViews 340c, SearchVolume 340d, and operation 342b, an outer right join. Likewise, via a GUI, such as via one or more manipulations, signal processing to yield the right outer portion of B in the Venn diagram in FIG. 3A may be generated. The outer portion of B in the Venn diagram in FIG. 3A may be used in combination with the intersection determined previously to provide meaningful results. An outer join (B/A) may be computed with SQL pseudo code, such as, by way of non-limiting example, without human involvement other than via a GUI, similar to Pseudo Code Example 2, below in Table 8.

TABLE 8

Right Outer Join Pseudo Code

SELECT
COUNT(DISTINCT f.user)
FROM adviews f RIGHT OUTER JOIN search g
ON
f.user = g.user
AND
f.ad_id = 1234
AND
g.s_string= "honda"
AND
g.user is NULL;

In one embodiment, a user defined function (UDF) 342c may be used to compare results of a join signal processing operation and a right outer join signal processing operation. For instance, UDF 342c may determine a ratio of a count of an intersection to a ratio of a count of a right outer join. That is, SPP 304b is capable of yielding a ratio of number of users who both viewed an advertisement and who searched a topic related to the advertisement, and number of users who searched a topic related to the advertisement without having viewed the advertisement. The foregoing, of course, is provided merely by way of non-limiting illustrative example.

In part, to demonstrate how a GUI may be employed to generate a SPP, FIG. 3B also illustrates a window 310 and a window 312. Window 310 includes a plurality of graphical components and/or visual indicators related to a feed and/or a repository. By way of illustration, in one simplified example, window 310 may include a feed of signal values, determined, for example, by inference via a schema crawler. By way of further example, window 310 illustrates an example feed, such as including a plurality of tables (e.g., AdViews and SearchVolume, by way of example). It is noted that window 310 may also show other feeds and/or portions of other feeds (e.g., as illustrated by 'Hbase,' 'Hive,' and 'RDBMS,' and which may be selected, such as via a mouse click). In one implementation, via graphical components and/or visual indicators of window 310, for example, selection of one or more signal samples to generate a SPP, among other things, may be accomplished.

Processing signal samples from a plurality of disparate sources presents additional technical challenges. For example, it may be delicate and/or challenging to integrate one or more signal samples from one source, such as, by way of example, from a 'Hive' feed in window 310, with one or more signal samples from another source, such as, by way of example, from 'HBase' feed in window 310. It may be, for example, that different feeds employ differing syntax and/or may comprise differing formats, thus rendering generation of a SPP more difficult. Rather, it would be beneficial for a common schema, for example, to be employed. By way of further illustration, AdViews in window 310 may comprise signal samples related to a user ID, which may refer to a user ID with a particular web portal (e.g., Yahoo!, Google, etc.), or which may refer to genericized ID, such as for users who have viewed advertisements, but were not signed into a web portal, by way of non-limiting example. Similarly, SearchVolume in 310 may also comprise signal samples related to a user ID. In one non-limiting example, therefore, user IDs may correspond, (which is something that might be sought to be identified, for example) but be stored in different schema, again, presenting a signal processing challenge.

In one embodiment, one or more searchable repositories may be employed to facilitate generation of a SPP by using one or more existing methods of schema matching and/or mapping. Schema matching and/or schema mapping, for convenience, referred to as schema matching, herein, means identifying one or more semantically-related signal samples (e.g., matching), and, as necessary, mapping and/or transforming one or more signal samples so that a consistent schema is utilized. Methods for schema matching are well-known and therefore need not be discussed in detail here; nonetheless, it is noted that schema matching is discussed in Erhard Rahm and Philip A. Bernstein, A survey of approaches to automatic schema matching, The VLDG Journal: 334-350 (2001). Thus, in an embodiment, such as of a GUI for generating a SPP, one or more feeds, such as of one or more signal sample, etc. (e.g., via window 310), may be transformed to a consistent schema to facilitate generation of a SPP, even if such signal samples had previously comprised signal samples in two or more different schema. It is likewise noted that a similar capability may be employed so that signal samples may be converted to another schema simply because another schema may be preferred, rather than because more than one schema is necessarily implicated.

Additionally, in certain cases, one or more signal samples may be available in a format (e.g., JSON) that may not be consistent with other portions or aspects of a SPP. Thus, it may be desired to convert the one or more signal samples for use in a different format (e.g., XML). In one illustrative embodiment, a user-defined function may be employed to extract signal samples from a feed comprising a first format, such that the extracted signal samples may be converted to a different format, for example. An illustrative user-defined function may extract one or more signal samples of a first format (e.g., stored in a repository or feed), and, optionally, may convert the one or more signal samples to a different format, such as for signal processing, by way of example. For instance, it is not uncommon for proprietary formats to be employed, such as by a service provider, for any number of reasons (e.g., security, etc.). However, it may be not be desirable for signal samples to be in a proprietary format if being employed in an SPP, for example. Typically, and particularly if dealing with proprietary formats, generation of a SPP may include extracting signal samples from a feed and converting the extracted signal samples to a more commonly used format, for example. Of course, processing one or more signal samples of different formats is not unique to cases involving proprietary formats. Thus, functions may be also employed, such as with more common formats including JSON, HTML, and XML, by way of example, in order to facilitate generation of a SPP by converting signal samples to a single, common format for processing by an SPP, for example.

Similar to the above discussion of window 310, window 312, as illustrated, provides a graphical display, such as with icons, of one or more operations that may be selected to generate a SPP. In terms of example operations, window 312 of FIG. 3B includes a selection operation, a join operation, a filter operation, a group by operation, a counting operation, and a customized UDF operation, by way of example. While a UDF operation may represent a relevant UDF operation for use in generation of a signal processing pipeline, with reference to the above discussion of potentially different signal sample formats, one or more customized UDF operations may be employed to extract signal samples from feeds and provide them in an appropriate signal sample format for consistency of processing for a SPP, for example. These and other operations may be used, such as in connection with a GUI, for example, to generate a SPP.

An example of use of a GUI to generate a SPP for one non-limiting embodiment is provided below as an illustration. The example demonstrates, for instance, selecting one or more signal samples and/or operations, visual rendition of a signal processing pipeline, and, briefly, generation of code to implement a SPP. For instance, to select one or more signal samples, a user may manipulate (e.g., click, etc.) an icon in window 310 referred to as "SearchVolume." The icon for SearchVolume may also be dragged and dropped, by way of non-limiting example, from window 310 to another window, or another portion of a window, as is illustrated by dotted line A. Responsive to GUI manipulation in window 310, and as illustrated by dotted line A, SearchVolume 340$b$ may be displayed in a portion of a window, such as a portion for generating a SPP 304$b$. Responsive to GUI manipulation, AdViews 340$a$ may be selected and/or otherwise moved to a portion of a window for generating a SPP 304$b$, such as is illustrated by dotted line B. Also responsive to GUI manipulation, join operation 342$a$ may be selected from window 312 and/or otherwise moved to a portion of a window for generating a SPP 304$b$, as illustrated by dotted line C.

In one embodiment, a SPP may comprise one or more signal processing operations. A signal processing operation refers to a combination of one or more signal samples and one or more operations to result in signal processing in the form of processed signal samples. Via a GUI, for example, one or more signal processing operations may be formulated, such as via one or more manipulations thereof. Thus, for example, GUI manipulations used to select SearchVolume 340b, AdViews 340a, and join operation 342a may, at least in part, be used to form a signal processing operation, in this illustrative case, a signal processing operation comprising SearchVolume 340b, AdViews 340a, and join operation 342a.

Furthermore, in one embodiment, a GUI may be employed to establish a relationship between SearchVolume 340b, AdViews 340a, and join operation 342a. A relationship may comprise, respectively, an input relationship, such as between one or more signal samples and one or more operations, and/or an output relationship, such as between one or more operations and one or more signal samples. A relationship may indicate which signal samples of, for instance, SearchVolume 340b and AdViews 340a, are to be used for join operation 342a. In one embodiment, a GUI manipulation of a graphical component and/or visual indicator for join operation 342a may open a window and/or otherwise present options for selection, as illustrated by window 314 in FIG. 3B. Although window 314 here displays options in relation to join operation 342a, a window may display options for other operations, such as, for example, responsive to GUI manipulation of one or more graphical components and/or visual indicators corresponding to other operations. In one example, a relationship between SearchVolume 340b, AdViews 340a, and join selection 342a may be formed, such as via a GUI, by manipulation of one or more components of window 314. To illustrate, SearchVolume 340b may comprise signal samples including, but not limited to, ID signal sample corresponding to advertisement IDs. Similarly, AdViews 340a may comprise signal samples including, but not limited to, search string samples. Window 314, as illustrated, includes two tabs (e.g., Tab 1 and Tab 2), though it is noted that any number of tabs may be employed, with a respective tab providing respective options, for instance, for one or more GUI components. For example, window 314 may comprise one or more drop-down lists, one or more buttons, and one or more radio buttons, by way of example. Of course, a number of additional graphical components and/or visual indicators are contemplated as well, as previously described.

In one embodiment, signal samples of SearchVolume 340b may be selected by manipulation of, in this non-limiting case, a drop down list (e.g., 'ad ID') or a button (e.g., 'Input'). Further, additional options may be selected, such as, for example, selecting a radio button (e.g., AND, OR, NOT) and an appropriate tab, and selecting one or more options at the selected tab. Further, in one embodiment, one or more output signal samples may be selected, such as via a button (e.g., 'Output . . . '). Of course, this discussion is merely illustrative and, therefore, should not be taken in a limiting sense. Indeed, a number of possible GUI-type methods and/or operations are contemplated, and claimed subject matter is not to be limited by the illustrative examples provided.

A relationship, such as shown in window 314, may indicate one or more operations that may be performed, such as, for example, join operation 342a. For example, a GUI may be manipulated, such as according to the above methods, such that SearchVolume 340b and AdViews 340a comprise input signal samples to be used with respect to join operation 342a. In one non-limiting embodiment, UDF operation 342c may receive output signal samples of signal processing, such as comprising SearchVolume 340b, AdViews 340a, and join operation 342a, for example. Thus, UDF operation 342c may have a relationship with join operation 342a such that UDF operation 342c comprises one or more output signal samples of join operation 342a. Further, in one embodiment, UDF operation 342c may also enable encoding, decoding, and/or extraction of one or more signal sample values, such as one or more signal sample values of differing formats.

In one non-limiting example, UDF operation 342c may be displayed via a GUI, such as by selecting a button (e.g., 'Output.' of window 314). For instance, in one embodiment, UDF operation 342c may be generated in response to one or more manipulations of a GUI to produce signal processing comprising SearchVolume 340b, AdViews 340a, and join operation 342a. In one case, for example, responsive to manipulation of a GUI to produce signal processing comprising SearchVolume 340b, AdViews 340a, and join operation 342a, a GUI may display UDF operation 342c as a graphical component and/or visual indicator of one or more output signal samples of the signal processing.

In one embodiment, additional signal processing operations may be generated, such as via a GUI. Further manipulations of a GUI may comprise selecting AdViews 340c, selecting SearchVolume 340d, and selecting a right join operation 342b, to generate signal processing of SPP embodiment 304b, for example. In one embodiment, and as discussed above, via a GUI, a relationship may be established between AdViews 340c, SearchVolume 340d, and selection operation 342b. For example, AdViews 340c may be selected. In one embodiment, a window, such as window 314, may present options via one or more GUI manipulations to establish the relationship.

Again, the foregoing is presented by way of illustration; claimed subject matter is not limited by illustrative embodiments, such as those discussed above.

Figure 4:
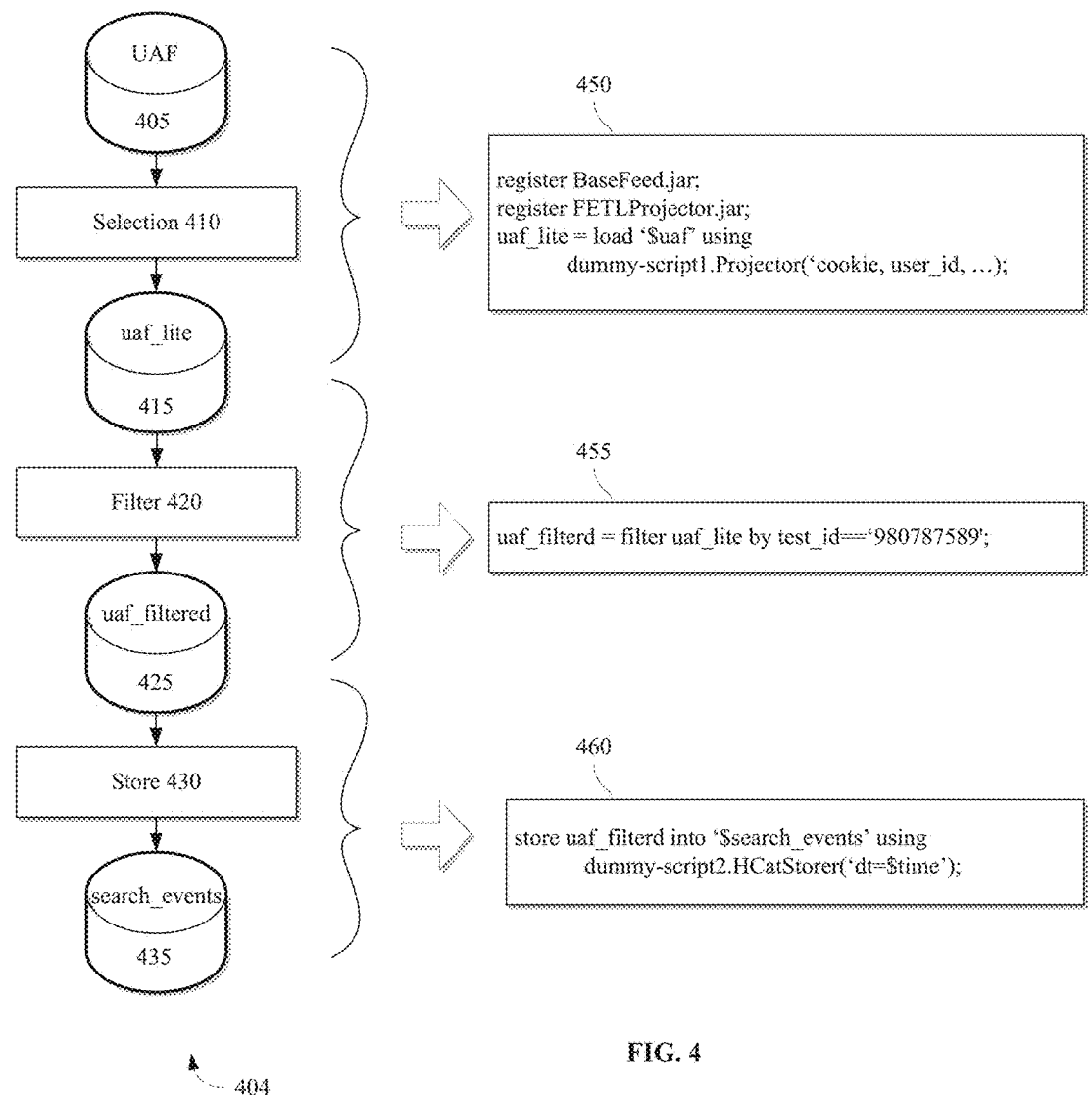
FIG. 4 is a block diagram illustrating another example of a method embodiment

As was mentioned above, in one embodiment, a GUI for generating a SPP may include generating executable instructions (e.g., code). FIG. 4 illustrates generation of code based, at least in part, on a visual instantiation of SPP 404. Here, assume a visual instantiation of SPP 404 has been generated as a result of GUI manipulation, for example.

Thus, in one embodiment, UserAccessFeed ("UAF") 405 comprises one or more signal samples (e.g., 'cookie, user_id, . . . '), and signal samples of UAF 405 may be selected, such as via a GUI, for selection operation 410. Furthermore, via a GUI, one or more output signal sample may be selected (e.g., 'uaf_lite'). In one embodiment, code, such as is illustrated in text box 450, for example, may be generated to implement an SPP. Code may comprise a number of forms. For instance, in a Hadoop distributed computing system that uses MapReduce, resulting code may be substantially in accordance with "Pig," more formally known as Pig Latin. Of course, claimed subject matter is not so limited. For instance, resulting code may alternatively be substantially in accordance with SQL, PHP, XML, Perl, Ruby, C, C+, C#, or any other suitable programming language.

Generation of code may be performed by a number of suitable methods. For example, a lookup table may be used having entries corresponding to, for example, operations. Thus, for a join operation, a lookup table may be referred to for one or more commands corresponding to the operation. For instance, if a join operation receives signals from feed A and a feed B to determine an intersection of user IDs, a lookup table may return syntax, such as the following:

```
SELECT column name(s)
FROM table1
JOIN table2
ON table1.column name=table2.column name;
```
and relationship signal sample values may be employed to yield the following:
```
SELECT userID
FROM A
JOIN B
ON A.userID=B.userID;
```
Of course, this is merely an illustrative embodiment and is not to be understood to limit claimed subject matter.

Returning to text box 450, code generated may be executable so that one or more signal samples from UAF 405 may be processed with resulting signal samples being properly placed in "uaf_lite" feed 415, such as via a selection operation.

In this example, remaining signal processing is also assumed to have been generated via a GUI, including a relationship between, for instance, uaf_lite 415, filter operation 420, uaf_filtered 425, store operation 430, and Search events 435, by way of example. For instance, in one non-limiting example, signal samples of uaf_lite 415 may be specified, such as via a GUI graphical component and/or visual indicator (e.g., a drop-down list and/or a button). Text box 455 includes sample code executable to implement signal processing comprising uaf_lite 415, filter 420, output uaf_filtered 425, for example, such as illustrated in FIG. 4. Likewise, signal processing comprising uaf_filtered 425, store 430, and resulting in Search events 435 may have one or more relationships specified, such as via a GUI. For instance, signal sample from uaf_filtered 425 may be stored into Search events 435, such as in response to execution, by a computing device, of sample generated code shown in text box 460. In one embodiment, code from text boxes 450, 455, and 460 may be executable to implement SPP 404, for example.

As was explained above, traditional methods of generating SPP may use substantial resources, time, and/or know-how. As described above, using a GUI to design and/or generate a SPP may lead to consumption of fewer resources and/or may use less technical know-how. Using a GUI may also beneficially combine design and coding, and/or may provide visualization of a logical progression of a SPP. In an embodiment, for example, a benefit of using a GUI to generate a SPP may include that, if one or more errors are identified in a testing and/or verification stage, fixing the one or more errors may be as simple as performing one or more manipulations of a GUI (e.g., altering a relationship between one or more signals and an operation, etc.). Furthermore, updated code may be generated responsive to the one or more manipulations of the GUI.

Furthermore, claimed subject matter may comprise an ability to represent, such as via a GUI, a logical progression of a SPP in a manner that may mimic, for instance, an algebraic expression. For instance, instead of, for example, using pseudo-code to design a SPP, a streamlined expression of components of a SPP (e.g., one or more signal processing operations, signal samples, and/or operations, by way of example) may be possible.

In one embodiment, a SPP may be presented via a GUI using relational algebra. Relational algebra refers to a formal method for characterizing signals and/or states to be processed by a SPP. Operations contemplated by a relational algebra framework may include, but are not limited to, a projection operation, a selection operation, a group by operation, a counting operation, a rename operation, different join operations (e.g., equijoin, semi join, ant join, left, right, and full outer joins, etc.), and a division operation, by way of non-limiting example. For example, FIG. 3A refers to a feedA and a feedB, and using relational algebra, a join of A and B may be expressed as A⋈B, a result of which comprises a set of combinations of tuples in A and B that comprise their common attribute names. As such, in one or more embodiments, relational algebra may be used, such as by a GUI, to effect signal processing. Thus, use of relational algebra, such as with a GUI, may provide yet another benefit.

As was discussed above, a workflow manager, such as Oozie, may be usable to deploy generated code to implement a SPP to a variety of server platforms, such as Hadoop platforms. A workflow manager may further be usable to schedule and/or monitor execution of generated code, such as the illustrative sample code explained above, such as substantially according to existing methods. Thus, a benefit of claimed subject matter may comprise a capacity to integrate with a number of possible workflow management systems.

In one embodiment, and without limitation, a GUI for generation of a SPP may be usable for generating code that may be specific to, for example, syntax of a given workflow manager. For instance, in one non-limiting example, a workflow manager may be selected within a GUI for generation of a SPP (e.g., Oozie), such as via an interaction with a graphical component and/or visual indicator of a GUI, and code may be generated to facilitate deployment of the generated SPP, such as via the GUI for generation of a SPP.

By way of illustrative example, and referring back to the example embodiment in FIG. 3B, a user may select one or more workflow managers, such as via interaction with a graphical component of a GUI, and potentially without user input other than via GUI actuation, code for deploying a SPP, such as across a Hadoop distributed network of computing devices, using one or more workflow managers, may be achieved. Generation of code for one or more workflow managers may be achieved much like the previous explanation of SPP code generation. For instance, based, at least in part, on a selected one or more workflow managers, and based, at least in part, on one or more signal processing operations of a SPP, code may be generated to implement a SPP using a selected one or more workflow managers.

Furthermore, in one embodiment, it may be possible for an SPP to include a capability to work with a variety of existing workflow managers. Thus, for instance, an SPP may be generated to use an Oozie workflow manager, or to use an Azkaban workflow manager, by way of non-limiting example.

Thus, a GUI for generating a SPP may beneficially allow generation of a SPP to be implemented across a number of possible platforms (e.g., Hadoop, Spark, etc.) using a number of possible workflow managers, without limitation. As a further benefit, use of resources including time, computing, and man-power resources may be reduced. It is to be understood, for instance, that by generating code for a workflow manager, less time may be expended by users, including, but not limited to, time generating code to implement a SPP on a given platform.

Figure 6:
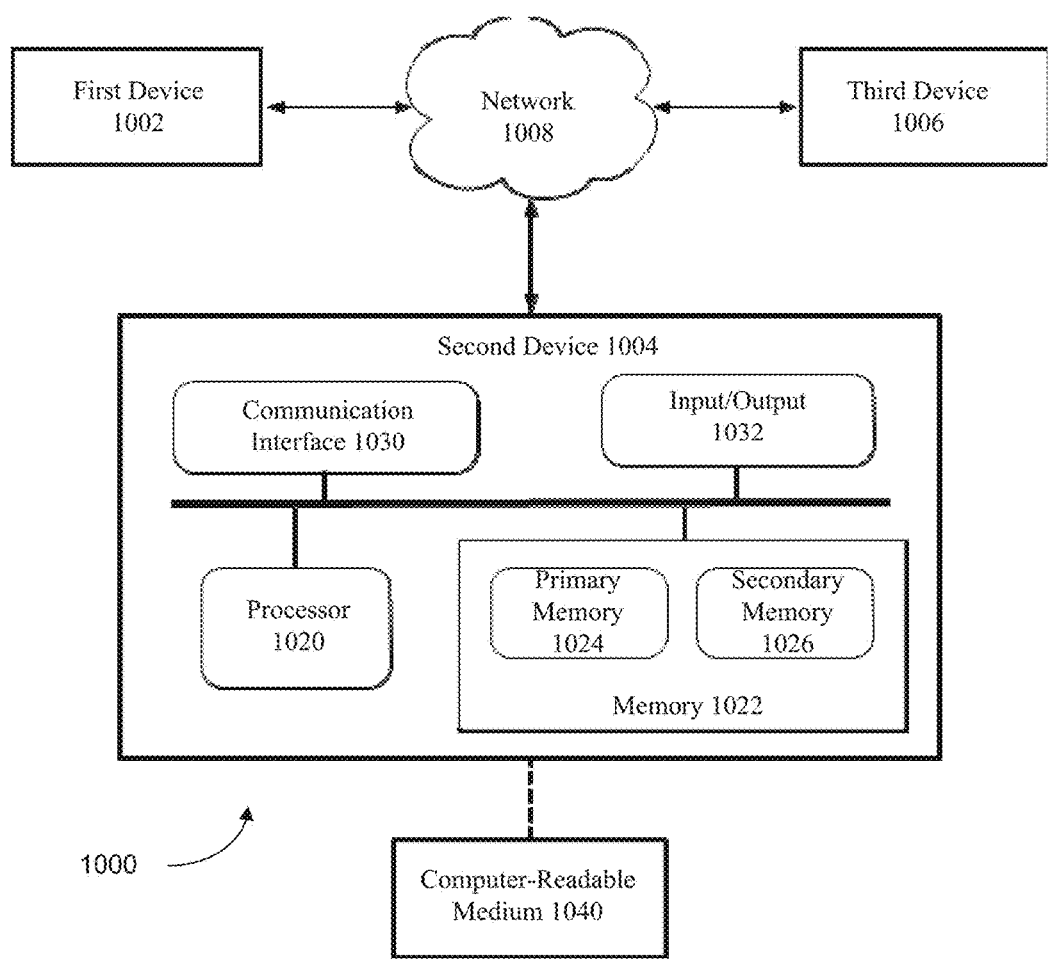
FIG. 6 is a block diagram illustrating a system embodiment.

For purposes of illustration, FIG. 6 is an illustration of an embodiment of a system 100 that may be employed in a client-server type interaction, such as described infra. in connection with rendering a GUI via a device, such as a network device and/or a computing device, for example. In FIG. 6, computing device 1002 (first device' in figure) may interface with client 1004 (second device' in figure), which may comprise features of a client computing device, for example. Communications interface 1030, processor (e.g., processing unit) 1020, and memory 1022, which may comprise primary memory 1024 and secondary memory 1026, may communicate by way of a communication bus, for example. In FIG. 6, client computing device 1002 may represent one or more sources of analog, uncompressed digital, lossless compressed digital, and/or lossy compressed digital formats for content of various types, such as video, imaging, text, audio, etc. in the form physical states and/or signals, for example. Client computing device 1002 may communicate with computing device 1004 by way of a connection, such as an internet connection, via network 1008, for example. Although computing device 1004 of FIG. 6 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1020 may be representative of one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In implementations, processor 1020 may perform signal processing to manipulate signals and/or states, to construct signals and/or states, etc., for example.

Memory 1022 may be representative of any storage mechanism. Memory 1020 may comprise, for example, primary memory 1022 and secondary memory 1026, additional memory circuits, mechanisms, or combinations thereof may be used. Memory 1020 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1020 may be utilized to store a program. Memory 1020 may also comprise a memory controller for accessing computer readable-medium 1040 that may carry and/or make accessible content, which may include code, and/or instructions, for example, executable by processor 1020 and/or some other unit, such as a controller and/or processor, capable of executing instructions, for example.

Under direction of processor 1020, memory, such as memory cells storing physical states, representing, for example, a program, may be executed by processor 1020 and generated signals may be transmitted via the Internet, for example. Processor 1020 may also receive digitally-encoded signals from client computing device 1002.

Network 1008 may comprise one or more network communication links, processes, services, applications and/or resources to support exchanging communication signals between a client computing device, such as 1002, and computing device 1006 ('third device' in figure), which may, for example, comprise one or more servers (not shown). By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1004, as depicted in FIG. 6, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1022 may store cookies relating to one or more users and may also comprise a computer-readable medium that may carry and/or make accessible content, including code and/or instructions, for example, executable by processor 1020 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   selecting one or more signal processing operations via manipulation of a graphical user interface (GUI) on a computing device coupled to a network, so as to form a signal processing pipeline ("SPP"), the selecting the one or more signal processing operations further comprising:
   selecting one or more stored binary digital signal values from one or more feeds;
   selecting one or more operations via the GUI; and
   generating the SPP based, at least in part, on the selected one or more stored binary digital signal values and the selected one or more operations; and
   generating code to implement the SPP substantially in accordance with the selected one or more signal processing operations.

2. The method of claim 1, wherein the SPP is presented visually.

3. The method of claim 1, wherein the one or more signal processing operations comprise operations to implement relational algebra.

4. The method of claim 1, wherein the selecting the one or more signal processing operations further comprises searching one or more feeds via the GUI using a search query.

5. The method of claim 1, wherein the one or more signal processing operations comprise at least one of a selection operation, a join operation, a filter operation, a group by operation, or a counting operation.

6. The method of claim 1, wherein the code is generated based at least in part from the formed SPP.

7. A method comprising:
   generating a representation of a signal processing pipeline ("SPP") to be used to generate code to implement the SPP, the generated representation to be responsive to signals selecting one or more signal processing operations via manipulation of a graphical user interface (GUI) on a client device, and the code to construct the SPP using the representation of the SPP;
   transmitting one or more signals representing one or more stored values of a feed of stored values for display via the GUI, wherein the transmitted one or more signals are based at least in part on a schema of the feed of stored values;
   transmitting one or more signals representing one or more operations for display via the GUI; and
   transmitting one or more signals representing the representation of the SPP based, at least in part, on the transmitted one or more signals representing one or more stored values of the feed of stored values and the transmitted one or more signals representing one or more operations.

8. The method of claim 7, wherein the transmitted one or more signals representing one or more operations comprise at least one of a selection operation, a join operation, a filter operation, a group by operation, or a counting operation.

9. The method of claim 7, wherein the feed of stored values comprises values related to user browsing behavior.

10. A system comprising:
    a computing device; the computing device to display a signal processing pipeline ("SPP") using one or more signal processing operations, responsive to signals to select one or more signal processing operations via manipulation of a graphical user interface (GUI) on a client device, and to generate code to implement the SPP substantially in accordance with the selected one or more signal processing operations, the computing device being further to:
    select one or more stored binary digital signal values from one or more feeds;
    select one or more operations via the GUI; and
    generate the SPP based, at least in part, on the selected one or more stored binary digital signal values and the selected one or more operations.

11. The system of claim 10, wherein the one or more signal processing operations are to comprise operations to implement relational algebra.

12. The system of claim 10, wherein the SPP is to be displayed on a display of the computing device.

13. The system of claim 10, wherein to generate code to implement the SPP is further to comprise generation of code to schedule and monitor implementation of the selected one or more signal processing operations across a distributed network of computing devices to execute the code to construct the SPP.

14. An article comprising:
    a non-transitory storage medium having instructions stored thereon executable to: display a signal processing pipeline ("SPP") comprising one or more signal processing operations, responsive to signals to select one or more signal processing operations via manipulation of a graphical user interface (GUI) on a client device, and to generate code to implement the SPP substantially in accordance with the selected one or more signal processing operations, the non-transitory storage medium also to comprise instructions executable to:

select one or more stored binary digital signal values from one or more feeds;

select one or more operations via the GUI; and generate the SPP based, at least in part, on the selected one or more stored binary digital signal values and the selected one or more operations.

15. The article of claim 14, wherein the non-transitory storage medium also to comprise instructions executable to transmit a message responsive to an error message of the SPP.

* * * * *